(12) United States Patent
Wade

(10) Patent No.: US 12,158,793 B2
(45) Date of Patent: *Dec. 3, 2024

(54) MANAGING DELIVERY OF POWER TO PROCESSING ELEMENTS

(71) Applicant: Block, Inc., Oakland, CA (US)

(72) Inventor: Jeremy Wade, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,234

(22) Filed: Feb. 15, 2023

(65) Prior Publication Data

US 2024/0053814 A1 Feb. 15, 2024

Related U.S. Application Data

(63) Continuation of application No. 17/819,249, filed on Aug. 11, 2022, now Pat. No. 11,609,624.

(51) Int. Cl.
*G06F 1/00* (2006.01)
*G06F 1/3206* (2019.01)
*G06F 1/3287* (2019.01)

(52) U.S. Cl.
CPC .......... *G06F 1/3287* (2013.01); *G06F 1/3206* (2013.01)

(58) Field of Classification Search
CPC .............................. G06F 1/3287; G06F 1/3206
See application file for complete search history.

(56) References Cited

U.S. PATENT DOCUMENTS

| 11,106,261 | B2 | 8/2021 | Naik et al. | |
| 11,609,624 | B1 | 3/2023 | Wade et al. | |
| 2020/0073466 | A1* | 3/2020 | Walsh | G06F 1/263 |
| 2021/0296963 | A1 | 9/2021 | Barbour | |
| 2021/0303059 | A1* | 9/2021 | Wang | G06F 1/3278 |
| 2022/0166216 | A1 | 5/2022 | Suzuki et al. | |

* cited by examiner

*Primary Examiner* — Nitin C Patel
(74) *Attorney, Agent, or Firm* — Polsinelli P.C.

(57) ABSTRACT

The present application describes a power management system for controlling delivery of power to a plurality of processing elements. The power management system includes a plurality of power management circuits arranged between terminals of a power supply. Each power management circuit is configured to connect to a processing element of the plurality of processing elements, and either supply sufficient power to power processing at the processing element, or prevent supply of sufficient power to power processing at the processing element. The power management system includes one or more power controllers arranged to determine whether or not to supply sufficient power to a processing element of the plurality of processing elements to perform processing.

20 Claims, 18 Drawing Sheets

201

300

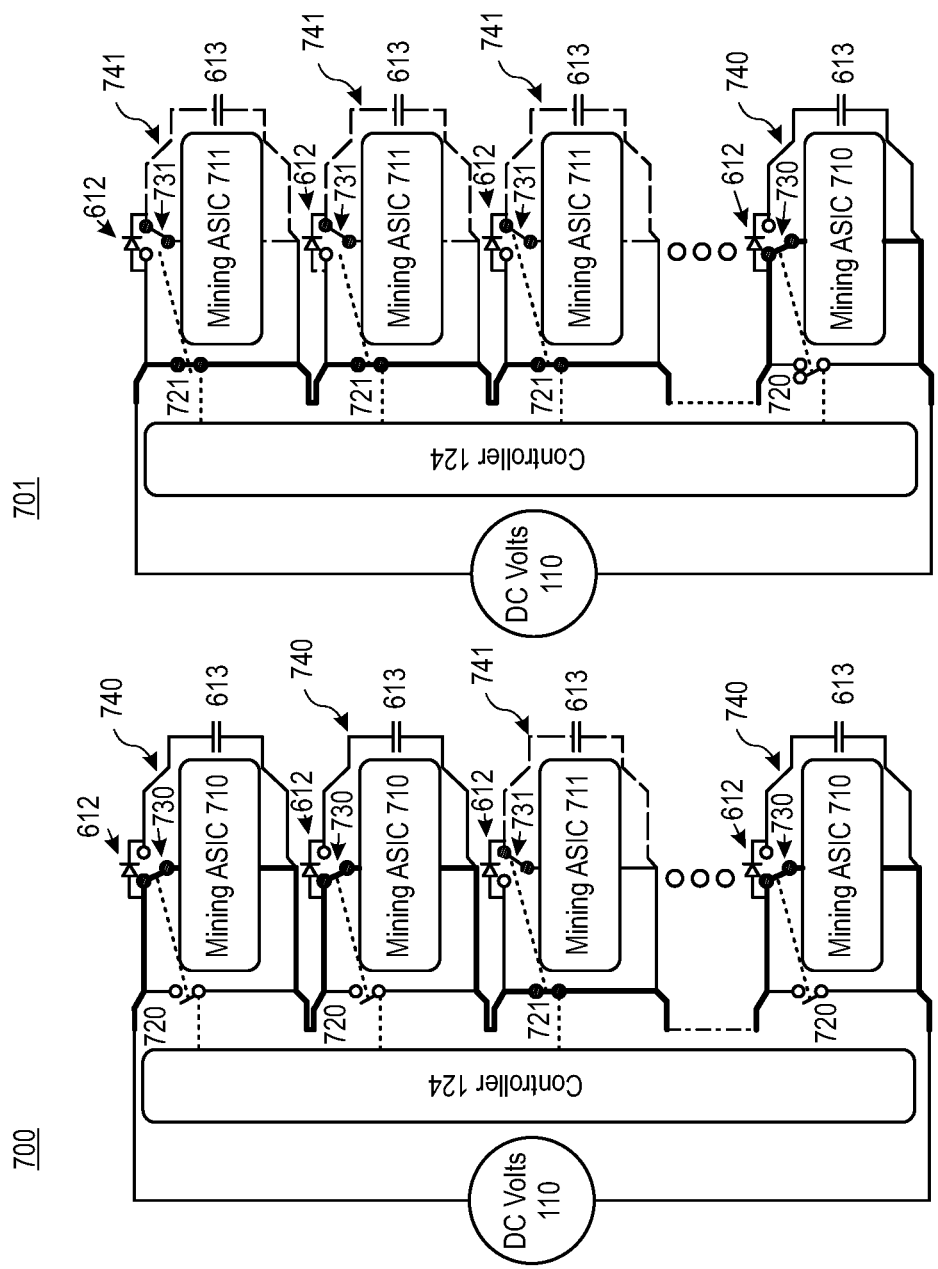

902

903

1000

1001

MANAGING DELIVERY OF POWER TO PROCESSING ELEMENTS

CROSS-REFERENCE TO RELATED APPLICATIONS

This application is a Continuation of U.S. patent application Ser. No. 17/819,249 filed Aug. 11, 2022, the full content of which is incorporated herein by reference in its entirety.

TECHNICAL FIELD

Large power consumption required by application-specific processing, such as cryptocurrency mining or artificial intelligence processing, requires large amounts of energy. This amount of energy is likely to increase over time, especially in the case of cryptocurrency mining using Proof of Work (PoW) consensus mechanisms, where a value of each block reward and complexity of mathematical problem to be solved increases over time, meaning there are higher incentives for cryptocurrency mining networks to increase their mining capacity. Current systems and methods of application-specific processing use non-renewable sources of energy, which in turn creates large carbon emissions due to the large amount of energy required. An alternative to the current systems and methods may be the use of renewable sources of energy, which has the advantages of reducing carbon emissions, reducing energy costs, and making use of an abundant supply of energy. However, the variable stability and efficiency of renewable sources of energy make application-specific processing difficult.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying drawings. In the drawings, the left-most digit(s) of a reference number identifies the drawing in which the reference number first appears. The use of the same reference numbers in different drawings indicates similar or identical items. The systems depicted in the accompanying drawings are not to scale and components within the drawings may be depicted not to scale with each other.

FIG. 7A illustrates an example diagram of a power management system comprising a plurality of power management circuits, with more power management circuits in an active state than an inactive state.

FIG. 7B illustrates an example diagram of a plurality of power management circuits of the power management system with less power management circuits in an active state than an inactive state.

DETAILED DESCRIPTION

Figure 1A:
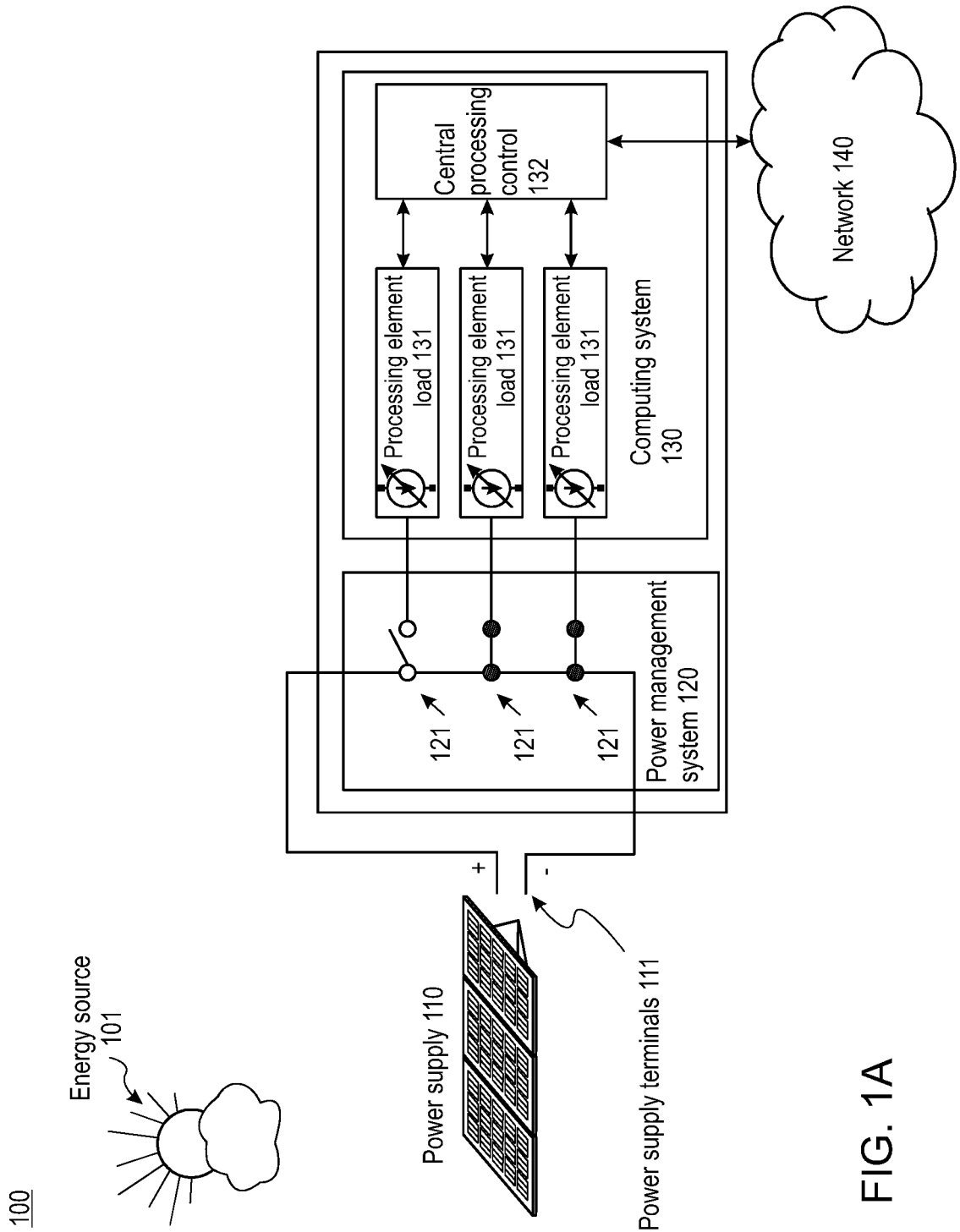
FIG. 1A illustrates an example power management system with reference to a solar powered cryptocurrency mining farm.

The technical problem of powering multiple processing elements with a power source that provides varying voltage is overcome by use of the power management system disclosed herein. Renewable energy sources, such as photovoltaic cells, produce a variable voltage and power due to the varying nature of the energy source being converted to electricity. For example, at different points throughout the day, as the sun rises then sets, as clouds thicken then clear, the amount of electricity produced changes. For a cryptocurrency mine which comprises numerous application-specific processors running together to attempt to solve a complex mathematical problem and identify a new block on the blockchain, the use of a variable power source may simply not be possible. This may be because the fixed nature of the power consumption of cryptocurrency mines conflicts with the variable nature of the power source. Cryptocurrency mining therefore may rely on non-renewable energy source, which can have a negative environmental impact.

The power management system disclosed herein overcomes these technical problems by enabling cryptocurrency mines to have a variable power demand, which is able to track the variable power available from the renewable energy source.

Cryptocurrency mines are computing systems comprising numerous application-specific processors, i.e. processors designed to perform the specific function of cryptocurrency mining, working together under central control to attempt to collectively identify the next block on the blockchain. Given individual application-specific processors have a relatively uniform power consumption due to the repetitive nature of the processing tasks they perform, the power management system is able to turn on and turn off certain application-specific processors amongst numerous application-specific processors in the mine to vary the overall power usage of the mine. Hence, by monitoring the voltage delivered by the power source and by turning certain application-specific processors amongst the numerous application-specific processors in the mine on and off to vary the overall power usage of the mine, the power usage can track the available power.

The power management system disclosed herein controls the power provided to each of the application-specific processors within a computing system or in the example of cryptocurrency, the cryptocurrency mine. The power management system may include an arrangement of switching circuits with a respective switch associated with each application-specific processor. Each switch is then controlled to either activate or deactivate a processor and therefore vary the overall power demand of the mine. A controller is able to monitor the input voltage and then uses logic to determine how to control the switching circuits in order to match the number of application-specific processors that are on, and therefore the overall power consumption of the mine, to the available power.

In arrangements disclosed herein, the amount of processing being performed at a cryptocurrency mine, or any other computing system managed by the power management system, can be increased because a computing power of the system is proportional to the power available at the power source. This is all due to the novel logic and switching performed by the power management system that makes the mine adaptive. Advantageously, the carbon footprint associated with proof-of-work based cryptocurrency mining can be dramatically reduced because it is possible to mine cryptocurrency effectively using a renewable energy power source. Furthermore, the efficiency of the mining facility, which comprises numerous application-specific processors, can be increased. Commercially, this can increase the amount of cryptocurrency mined for the available renewable energy.

In some arrangements, the controller may be able to take additional factors into account to make the power management system more adaptive. For example, the power management system may use logic to determine which of the processors to turn off or on. If one processor is detected to be overheating, or faulty, or at an important stage in its processing, a decision could be made to turn that processor off or keep it on, rather than one or more other processors. Hence, sophisticated logical decisions can be made to make a highly intelligent power management system. With this additional functionality, it is possible to increase the longevity of components of the mine or increase processing efficiency. In turn, this can increase the chance of a mine identifying the next block on the blockchain because the amount of processing achieved for the available power produced is increased.

An implementation of the following disclosure relates to a power management system configured to deliver power to a computing system 130 having multiple processing elements, such as application-specific integrated circuits (ASICs). The processing elements may be arranged to perform cryptocurrency mining. However, the power management system could be applied to power management of other processing, particularly other application-specific processing, such as artificial intelligence processing, where the power usage remains relatively constant when processing is taking place.

Cryptocurrency mining that utilizes a PoW consensus mechanism requires a certain amount of application-specific processing effort to be expended in order to solve a complex mathematical equation and prevent a cryptocurrency network being compromised. In order to identify new cryptocurrency, known as mining, miners will run powerful computing systems to solve the complex mathematical equation which identifies the next block in the blockchain. It is common for cryptocurrency mining farms to be set up comprising a large computing system including numerous ASICs. Each ASIC is controlled by a central processing controller and tasked with attempting to solve the complex mathematical equation, or a part thereof. The central processing controller essentially communicates with a distributed blockchain ledger via a network and sends the ASICs data to process. Cryptocurrency mining, specific cryptocurrency protocols such as Bitcoin and Ethereum, and associated blockchain technologies, are well-known and it is assumed that the skilled person would have an understanding of the power demands and working of the computing systems 130 that drive these technologies. Furthermore, it will be appreciated that other crypto or blockchain-related processing such as non-fungible token (NFT) minting or cryptocurrency transfer resulting in updates to the blockchain could also utilize the system disclosed herein.

Cryptocurrency mining has a predictable power usage as the processing is not user dependent so does not fluctuate considerably. The result is that each ASIC making up the computing system will have very similar power requirements, therefore power management circuits of the power management system may be connected in series between terminals of the power supply for supply of power. Further, as current has to be the same over the series stack of power management circuits of the power management system, there is a constant current usage along the series chain of ASICs. Having ASICs arranged in series is advantageous for cryptocurrency mining, and other application-specific processing, because it draws much less current than having ASICs arranged in parallel.

In FIG. 1A, a cryptocurrency mining farm 100 comprises a power supply 110, a power management system 120, a computing system 130 and a network 140. The power supply 110 that is providing power to the computing system 130 through the power management system 120 via power supply terminals 111 of the power supply 110 is a photovoltaic array using the sun as an energy source 101. By nature, during the course of the day as the sun rises and sets, and as clouds block a direct line between the sun and the photovoltaic array (power supply 110), the output voltage from the power source will vary. To manage the computing system 130 when the power supply 110 has a variable voltage, the power management system 120 matches the power usage requirements of the computing system 130 to the power being delivered by the variable power source. In particular, the power management system 120 is able to disable one or more processing elements 131 of the computing system 130 to reduce the power requirements of the computing system 130 when the power delivered by the power supply 110 reduces, e.g. when a cloud passes over the photovoltaic array. This is shown in FIG. 1A as the energy source 101 of the sun is partially covered by a cloud, resulting in only two of three power management circuits 121 of the power management system 120 being connected to a respective processing element 131 (or processing element load). Although only three power management circuits 121 and processing elements 131 are shown, examples provided could be any number of each. When the processing elements 131 are connected to power management circuits 121, the processing elements 131 are able to process data received from a central processing controller 132 of the computing system 130. The central processing controller 132 communicates with the network 140 to send the data for processing to the processing elements 131.

Furthermore, when the power produced by the power supply 110 increases, e.g. clouds over the photovoltaic clear or become thinner, the power management system 120 is able to enable one or more processing elements 131. The power demand of the computing system 130 and therefore the processing capability of the computing system 130 is able to increase and decrease in line with the available power produced by the variable power source harvesting power from the sun.

The power management system 120 described herein therefore allows the maximum amount of available power produced by the power supply 110 to be usefully used. The number of enabled processing elements 131 dynamically changes to track power extraction from the power supply 110 based on one or more characteristics, which in this case is a variation in voltage of the power supply 110. However, the power management system 120 may factor in other characteristics such as a thermal characteristic, one or more faults of a processing element 131, a current state of processing of a processing element 131, or a current draw of a processing element 131. Advantageously, the instability of the power supply 110 has a reduced effect on the efficiency of the computing system 130 due to the power management system 120 described herein. Furthermore, the amount of processing that can be achieved by the computing system 130 can be dynamically changed to meet the available power of the power supply 110. By providing this adaptive system for matching power demand to power supply 110, it is possible to mine cryptocurrency efficiently and effectively using a renewable energy source, which in turn reduces the carbon footprint of the cryptocurrency mining farm 100.

Additional details are described below with reference to several example implementations.

Figure 1B:
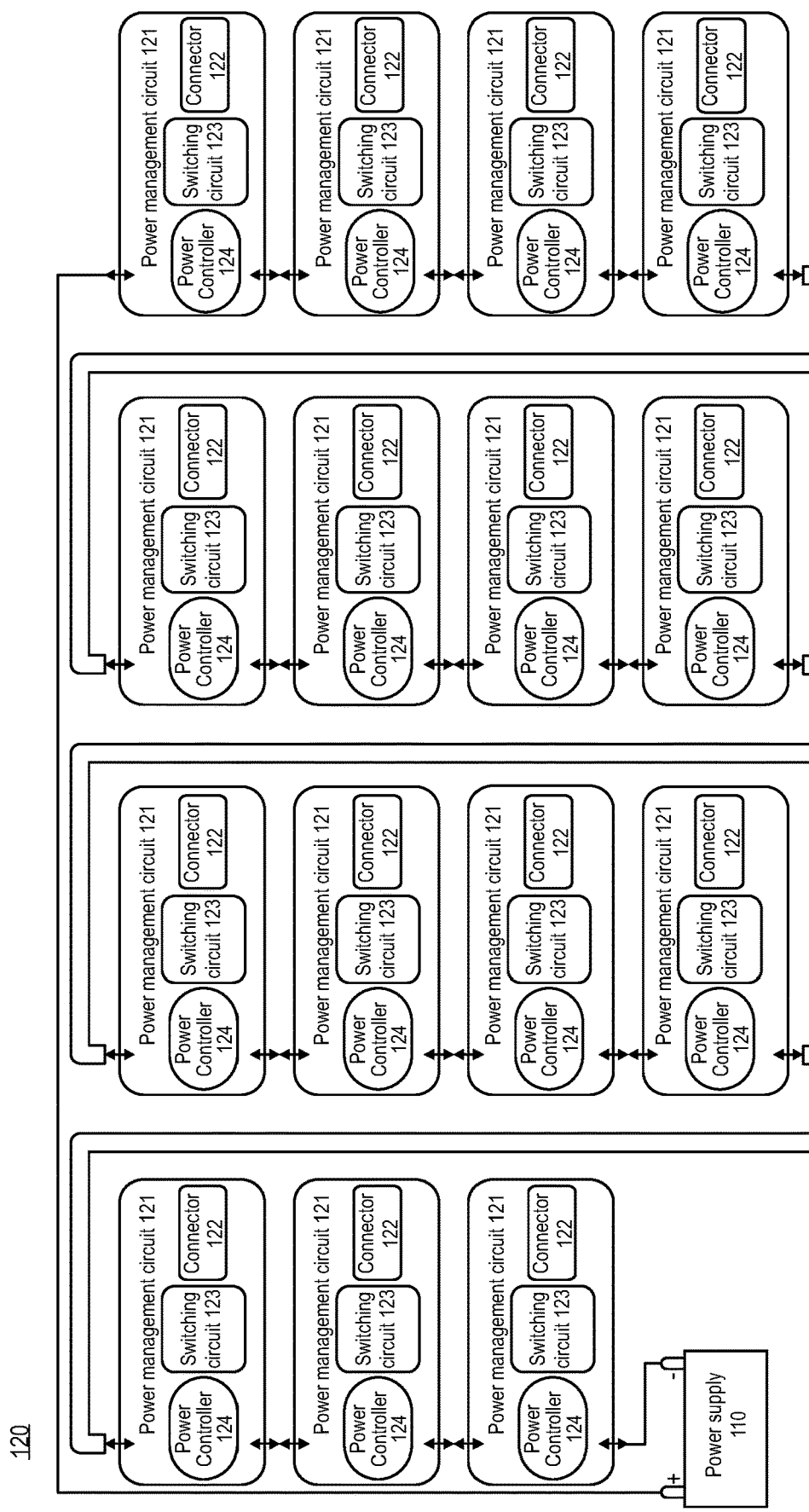
FIG. 1B illustrates an example diagram of the power management system of FIG. 1A.

FIG. 1B illustrates an example diagram of the power management system 120 of FIG. 1A, for managing delivery of power from a power supply 110 to the computing system 130 comprising multiple processing elements 131, the power management system 120 comprising a plurality of power management circuits 121. Each power management circuit 121 comprises a power controller 124, a switching circuit 123, and a connector 122, each of which is discussed in more detail with reference to FIG. 1C. The plurality of power management circuits 121 as shown in FIG. 1B are connected in series between terminals 111 of the power supply 110. The connection of the power management circuits 121 in series forms a series stack of processing elements 131.

The power supply 110 is a photovoltaic array which converts solar energy received from the sun into electricity. The power supply 110 therefore outputs a variable DC voltage. In some embodiments the power supply 110 is another form of renewable energy source power supply such as wind, geothermal, biomass, tidal, or hydropower. In other embodiments, the power supply 110 is a non-renewable energy source having a variable output voltage. In yet further embodiments, the power supply 110 is an AC power supply which has been rectified to DC, i.e. AC rectified mains. In some embodiments, the power supply 110 is a differential voltage. The power supply 110 may be referred to as a DC power supply, a first power supply, a voltage supply, a variable voltage supply, a direct current (DC) power source, an AC power supply, a rectified AC power supply, or AC rectified mains.

The power management system 120 comprises power management circuits 121, which control the delivery of power from power supply 110 to an associated processing element 131 (not shown in FIG. 1B) as will be described in more detail. The power management circuits 121 control the delivery of power to essentially enable and disable specific processing elements 131. This balances the power requirements of the computing system 130 with the power available from the power supply 110. Each power management circuit 121 may be identical and therefore can be disposed anywhere in the plurality of power management circuits. In other words, each power management circuit 121 can be disposed anywhere in the ASIC stack. It will also be appreciated that while 15 power management circuits 121 are shown in FIG. 1B, any number of power management circuits 121 could be used depending on the power and processing requirements of the computing system 130 that the power management system 120 serves. Each power management circuit 121 may be referred to as a development board, or a hashing board.

Figure 1C:
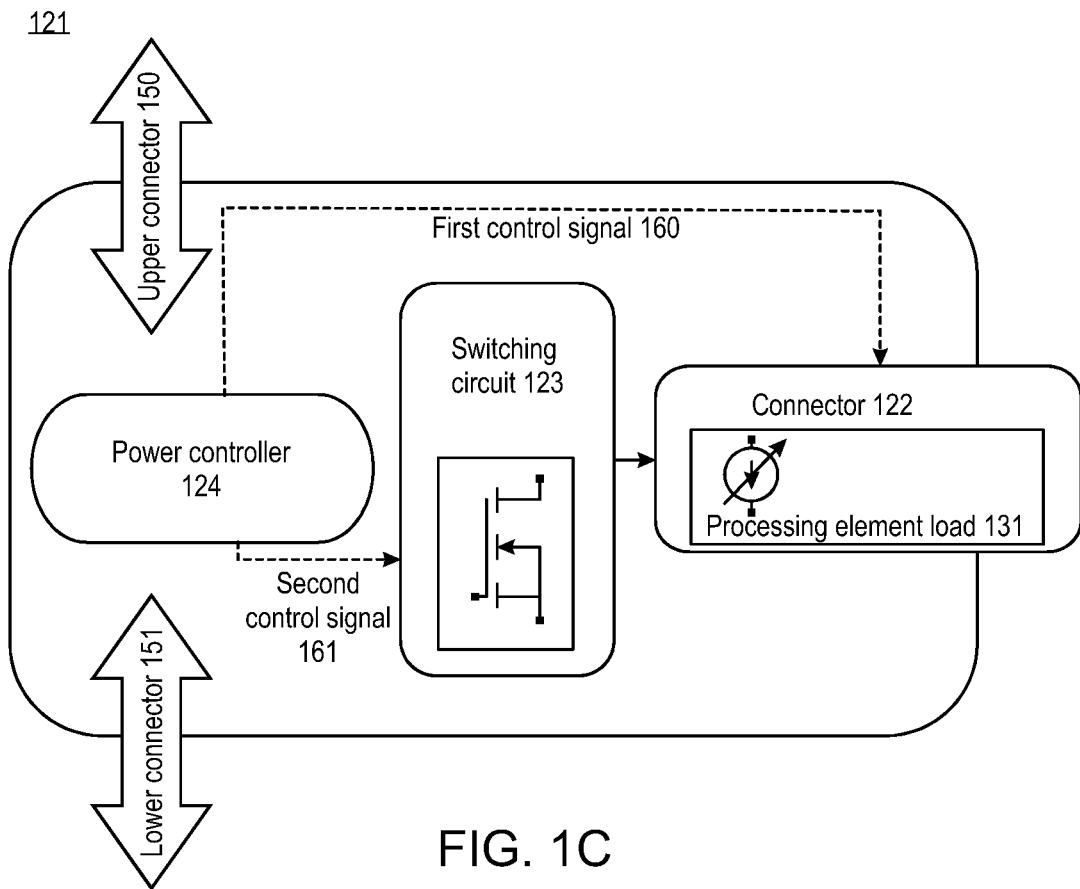
FIG. 1C illustrates an example diagram of one power management circuit within the power management system of FIG. 1B.

FIG. 1C illustrates an example diagram of one power management circuit 121 within the power management system 120 of FIG. 1B. The power management circuit 121 is configured to be connected to a neighboring power management circuit(s) 121 by one or both of an upper connector 150 and a lower connector 151. The upper and lower connectors 150, 151 allow the flow of current for enabling the processing element 131 from the switching circuit 123 to the connector 122 and into the processing element 131, as shown with a solid arrow. The upper connector 150 and lower connector 151 also enable sending and receiving of control signals 160, 161 (such as throttle control, management signals, and/or communication control signals). A first control signal 160 is sent from the power controller 124 to the connector 122 (as shown with a dashed arrow) to throttle a power usage of the processing element 131, i.e. the first control signal provides throttling control. In some embodiments throttling functionality is not provided and therefore the connector 122 does not provide a connection for first control signal 160. A second control signal 161 is sent from the power controller 124 to the switching circuit 123 (as shown with a dashed arrow) to determine when the switching circuit 123 should switch between an active or inactive state. The first control signal 160 may also command a processing element to stop processing prior to a corresponding switching circuit 123 switching to an inactive state due to the second control signal 161 with a view of reducing latency. Less latency in the control of the processing element 131 means less inefficiencies associated with enablement and disablement of the processing element 131.

For avoidance of doubt it is noted that the upper connector 150 and lower connector 151 need not be arranged above and below one another physically, this is just a schematic representation. Hence, the upper connector 150 and lower connector 151 may also be referred to as first and second connectors.

Each power management circuit 121 may only be aware of a power domain of a neighboring power management circuit 121, resulting in non-operational power management circuits 121, or power management circuits 121 with a switching circuit 123 in an inactive state, causing no effect on the other power management circuits 121 in the series chain. This is because the power management circuits 121 are connected in series, thereby increasing energy saving within the power management system 120. In other embodiments the power management circuits 121 may be grouped together, resulting in groups of power management circuits being connected in series in a stack. The voltage across the power management circuit 121 is confined to a power domain, so the connection of neighboring power management circuits 121 allows symmetric stacking. Symmetric stacking may be defined as stacking groups of power management circuits.

The power management circuit 121 may be a printed circuit board (PCB) module. The power management circuit 121 may have a low voltage supply. This is advantageous because reduced power requirements of the power management circuits 121 results in the requirement of less energy when the processing elements 131 of the computing system 130 are processing (or hashing).

The power management circuit 121 comprises the connector 122 which connects the power management circuit 121 to a processing element 131 arranged to perform application-specific processing. Each connector 122 may interface to one processing element 131, or a processing element load. The connector 122 may be a socket into which the processing element 131 is inserted. The connector 122 may in other embodiments be circuit board track or through holes onto which a processing element 131 is soldered. The connector 122 could be the solder connecting the processing element 131 to the power management circuit 121 in yet further embodiments. The processing element 131 has a relatively predictable current draw. The processing element 131 is an ASIC in this embodiment. However, the processing element 131 may be a plurality of ASICs such as a cluster of ASICs connected to one power management circuit 121. The processing element 131 may be any other suitable processing means, and in most arrangements is some form of processor arranged to perform a type of application-specific processing.

Even though the connector 122 provides a connection means for the processing element 131 to the power management system 120, the connector 122 may not be aware of the power management system 120 and/or the power supply 110. This is because the connector 122 may simply be a means of connecting the processing elements 131 with an input voltage and the first control signal 160 from the power controller 124, and, in some embodiments, to allow access to registers to store solutions to complex mathematical equations, or a part thereof. Each power management circuit 121 may provide a connector 122 with power sufficient to enable processing from the power supply 110 via series stacking of the plurality of power management circuits 121, and therefore, of the processing elements 131. Any processing element 131 connected to any connector 122 should be able to consume the power sufficient to enable processing. Processing elements have a minimum voltage and/or power requirement to enable them to function correctly and therefore perform the processing operation that they were designed to perform. Such minimum voltage and/or power requirements represent the power sufficient to enable processing. When there is sufficient power and the processing element is therefore processing, the processing element can be considered to be in an active state.

The processing element 131 receives data for processing via a separate data connector from the central processing controller 132. However, in other embodiments, the connector 122 provides both power and data connectivity.

The switching circuit 123 is arranged to control delivery of power from the power supply 110 to the connector 122 for use by a processing element 131 connected to the connector 122, in use. The switching circuit 123 switches between (i) an active state where power sufficient to enable processing is provided from the power supply 110 via the connector 122 to the processing element 131, and (ii) an inactive state where power sufficient to enable processing is not provided to the processing element 131. This functionality is discussed in more detail in relation to other features and figures. In the active state, the power delivered from the power supply 110 to the connector 122 for use by the processing element 131 can be greater than or equal to a power threshold indicative of sufficient power to power processing. In the inactive state, the power delivered from the power supply 110 to the connector 122 for use by the processing element 131 can be less than the power threshold indicative of sufficient power to power processing.

The switching circuit 123 comprises a direct analogue feedback circuit to provide power normalization and protection of the processing element. Without the use of the switching circuit 123, if one processing element 131 stopped drawing a set amount of current, a voltage across the processing element 131 would increase and cause damage to the processing element 131. The switching circuit 123 comprises a transistor-based element with a conductivity controlled by the second control signal 161. The conductivity of the transistor-based element is controlled by an input voltage from the power controller 124. In the current example, the switching circuit 123 is a field effect transistor (FET). Therefore, the switching circuit 123 comprises a source, a gate, and a drain. The switching circuit 123 may comprise a metal oxide semiconductor FET (MOSFET), which when driven in enhancement-mode, has no path between the drain and source when no voltage is applied between the gate and source terminals. However, when a gate-to-source voltage is applied, a MOSFET can conduct current. During steady state operation, the MOSFET is fully off, so precise power control tuning may be accomplished through modulating the load power usage as described herein. As FETs are controlled by gate charge, once the gate is closed or open, there is no additional power draw, thereby allowing low-power switching.

The power controller 124 controls the switching circuit 123. In particular, the switching circuit 123 switches between the active state and the inactive state depending on the second control signal 161 received from a power controller 125 of a corresponding power management circuit 121. The power controller 124 determines whether or not a switching circuit 123 of a power management circuit 121 of one of the plurality of power management circuits 121 should be in an active state or an inactive state based on at least one characteristic. In this embodiment, the characteristic is the voltage of the power supply 110. However, in other embodiments, the characteristic may be a change in voltage of the power supply 110. A power source output power or variation in output power may also be the characteristic in another embodiment. In some embodiments, the characteristic is slew rate. Slew rate is the maximum rate at which the system can respond to a rapid change in voltage of the power supply. The slew rate may be considered because the system can better tolerate a rapid but predictable change, or a less rapid but unpredictable change in voltage of the power supply, over a rapid but unpredictable change in voltage of the power supply. In yet further embodiments, a detected change in the renewable energy source, e.g. lumens received from the sun, may be used to enable early determination of likely changes to output power.

In other embodiments, the power controller 124 can be arranged to consider other characteristics. For example, other characteristics could be characteristics of one or more of: the power management system 120; the one or more processing elements 131 arranged to be connected to one or more of the plurality of power management circuits 121 in use; and the computing system 130 to which the power management system 120 manages delivery of power.

For example, the at least one other characteristic may include a thermal characteristic. In such circumstances, overheating of a specific processing element 131 may be detected, or an area of the overall system where certain processing elements 131 are located may be detected. If a certain number of processing elements 131 need to be disabled due to a reduction in voltage being detected at the power supply 110, the power controller 124 can choose to disable those processing elements 131 that risk overheating. Advantageously, this can help increase the longevity of the processing hardware and the reliability of the overall system.

Another characteristic that is considered in other embodiments is the current state of a processing element 131 arranged to be connected to each of the plurality of power management circuits 121. For example, if a processing element 131 is near completion of a processing task then it may be preferable not to disable that processing element 131 so that processing can be completed. In contrast, it may be preferable to disable a processing element 131 where processing has only just started so that the processing task it has just started can be assigned to a different processing element 131.

Other characteristics may include one or more of faults of a processing element 131 or a current draw of a processing element 131. The processing elements 131 have a relatively a predictable current draw, however, if this changes due to a fault or otherwise within a processing element 131, the power management circuit 121 may disable the processing element 131, rotate the processing element 131 out of the computing system 130, and replace the processing element 131.

Each power controller 124 may be described as a board-level controller, a development board controller, a hashing board controller, a lower power controller, a Programmable Interface Controller (PIC), a microcontroller, or an Advanced RISC (Reduced Instruction Set Computer) Machine (ARM) controller.

In some embodiments, each of the power controllers 124 comprises one or more controller switching elements, each controller switching element associated with a power management circuit 121 of the plurality of power management circuits 121 and arranged to switch on or off according to whether or not a threshold of the at least one characteristic is met.

In other embodiments, the power management circuits 121 may not have dedicated power controllers 124, but instead a single central power controller 124 may be provided. In such embodiments, the central power controller 124 may be a dedicated circuit or electronic chip arranged to perform the required functionality. Alternatively, the central power controller 124 may comprise a processor and a memory, the memory storing computer-readable media, e.g. code, arranged to implement a method on the processor for controlling the power demand of the computing system 130. In other words, the central power controller 124 may be implemented in software.

In any manner, the one or more power controllers 124 is arranged to determine, based on one or more characteristics of the power supply 110, whether or not a switching circuit 123 of one of the plurality of power management circuits 121 should be in an active state or an inactive state, and wherein the one or more power controllers 124 sends a second control signal 161 to the switching circuit 123 of the one of the plurality of power management circuits 121 based on the determined state. The central power controller 124 may make a determination in relation to enabling or disabling each of the processing elements 131 in one operation and may send a first control signal 160 to one or more connectors 122 so the connected processing elements 131 either reinitialize or stop attempting to draw current from the power management system 120. Responsive to the determination, the central power controller 124 sends a second control signal 161 to the corresponding switching circuits 123 to instruct the switch to change to either an active or an inactive state. In this manner, the first control signal 160 enables the ability of stopping current draw from the processing element 131 before an input voltage for the processing element 131 is bypassed when the switching circuit 123 is in an inactive state due to the second control signal 161. In this example, latency is reduced due to inefficiencies being mitigated.

In alternative embodiments there is either a central power controller 124, or the power controllers 124 of each power management circuit 121 may communicate with a separate central controller 124. In such embodiments, if enabling and disabling of processing elements 131 can be tolerated on relatively short notice for short periods of time, then nodes of the power management system 120 between power management circuits 121 can rapidly adapt to changing instantaneous levels of a total voltage across the plurality of power management circuits Vstack. The total voltage across the plurality of power management circuits is equal to the sum of the individual voltage drops in the power management system, which is described with reference to FIG. 8C. There may be a current state of processing of a processing element 131 where disabling the processing element 131 would be tolerated better than disabling a different processing element 131 at a different state of processing, e.g. if the processing element 131 has just started a processing task. For power management circuits with a processing element 131 that has just started a processing task, a corresponding switching circuit 123 may be switched to an inactive state when the total voltage across the plurality of power management circuits Vstack decreases due to, for example, clouds blocking a direct line between the sun and a photovoltaic array connected to the power supply 110.

The power controller 124 may also be configured to modulate or throttle a power usage of each processing element 131 arranged to be connected to the power management circuit 121 when a corresponding switching circuit 123 is in an active state. The modulation of power usage may be called throttle control, which is provided from the power controller 124 to the connector 122 via the first control signal 160. Throttle control may be used to make small adjustments to the power usage of processing elements 131 when there are relatively small changes in power from the power supply 110 (e.g. when a cloud passes over the photovoltaic array), but not sufficient changes to justify disabling a processing element. In some embodiments an increase in electronic stability of the power management circuit 121 is enabled because throttle control helps to finetune the power usage of processing elements 131. The second control signal 161 flows from the power controller 124 to the connector 122 and the switching circuit 123. The second control signal 161 may also comprise a management signal and/or a communication control signal. The second control signal 161 may then be received by the processing element 131 and used by the processing element 131 to adjust its power demand on the connector 122. In some embodiments, precise throttle control is required (e.g. when a purely analogue circuit is connected around a processing element 131 in a system (e.g. a cryptocurrency mining farm 100) comprising a photovoltaic power supply 110) to tailor the overall system to a power curve of the power supply 110, as described with reference to FIG. 5. Throttle control can be provided from a voltage monitor of the power management circuit, or more specifically the switching circuit 123.

Communication channels between neighboring power management circuits 121 enable a flow of first control signals 160 between the power management circuits 121. The function of the communication channels may be implemented using the upper connector 150 and lower connector 151, a central power controller 124, or separate communication channels between neighboring power management circuits. The modulation and control of power usage using control signals 160, 161 may comprise one or more of: clock dithering, clock skipping, analogue input for phase locked loop (PLL) steering, and a fully digital protocol control over the communication channel. PLLs generate a core clock inside each processing element 131.

The total power draw of each processing element 131 can be tunable through the PLL value. In this example which is also an example of throttle control, Universal Asynchronous Receiver-Transmitter (UART) registers may command the processing elements 131 to reduce their internal clock speeds or to turn off or disable some or all (hashing) engines within the processing elements 131 to reduce a load of the processing elements 131.

In some examples, clock speed may be used to finely balance the stack of power management circuits 121 and set a PLL value to adjust imbalances in the stack of power management circuits 121 to maintain a total voltage Vstack. In this example which is also an example of throttle control, a reference input clock frequency being fed into the processing elements 131 is varied. This is an analog example called clock skewing which improves system performance and may be used to make small adjustments because varying the reference input clock frequency too much or too quickly may negatively affect the PLL.

In another example, when an input pin of a processing element 131 is driven to logic active, the internal clock of the processing element 131 synchronously halts. This is known as clock gating and involves removing a clock signal when the circuit is not in use, i.e. halting the internal clock of the processing element 131. Hardware clock gating is advantageous because it reduces dynamic power dissipation in the system. The input pin is a high gain pin. In this example, clock dithering or skipping is possible as AC waveforms may be used at the input pin to create a dithered clock signal at (hashing) engines inside the processing element 131. This is advantageous the use of hardware clock gating is fast and so provides reduced control latency, leading to fewer inefficiencies associated with enablement and disablement of a processing element 131.

Registers that need to be initialized may be maintained in the voltage domain of a corresponding power management circuit 121. In one example, the registers that need to be initialized may be maintained in the voltage domain of a second voltage supply Valways, which is described with reference to FIGS. 2A-2B. The registers of a processing element 131 may be read if the processing element 131 is near completion of a processing task and a second control signal 161 is received by a corresponding switching circuit 123 to switch the switching circuit to an inactive state. This is because the registers can be rewritten to the processing element 131 before the next processing cycle begins, resulting in less computational power required as the complex mathematical equation does not need to be solved from the beginning. Rewriting of registers may be reduced if the power supply 110 can be tracked or is predictable. For example, when the power supply 110 is an AC power supply which has been rectified to DC.

If there is no hardware control line for the control signals, software, or a UART communication protocol may referred to as a first control signal 161 to disable processing by the processing element 131 before the corresponding switching circuit 123 switches to an inactive state, thereby removing the relevant power management circuit 121 from the stack of power management circuits 121. As already described, this may be required when the power supply 110 is variable. Once processing by the processing element 131 has been disabled (i.e. the processing element 131 is not being provided with sufficient power to enable processing), any registers with solutions to the complex mathematical equations may be read. When the switching circuit 123 switches to an active state where power sufficient to enable processing is provided to the processing element 131, a UART packet may re-enable the processing element 131 and refresh the registers of the processing element 131. Using UART for clock skewing may provide a solution with reduced control latency. However, this is just an example and hardware clock gating may be used to perform clock dithering or skipping due to reduced dynamic power dissipation in the system.

If the voltage of the power supply 110 changes predictably, latencies may be well considered. If the voltage of the power supply 110 changes slow but unpredictably, latencies may also be appropriately considered. Conversely, if the voltage of the power supply 110 changes quickly and unpredictably, latencies are more difficult to consider so the power management system 120 may only be efficient with a low level of latency. A slow ramp-up voltage may be used within the software method to supply a power supply 110, which may slowly increase the ramp-up voltage to the power management circuits 121, to turn on each processing element 131 quickly. Any processing element 131 may be turned off as long as the total voltage across the power management circuits 121 is balanced. As PoW in cryptocurrency mining produces a new block on the blockchain when the system outputs a correct hash, the blockchain making process has a time limit that rapidly changes. Indeed, there is a certain time limit where cryptocurrency mining work done is still useful. Therefore, latencies or delays in the work process are not as fatal as other applications because a miner is still rewarded for work done when an output of the cryptocurrency mining architecture 100 matches a block in the blockchain.

Figure 2A:
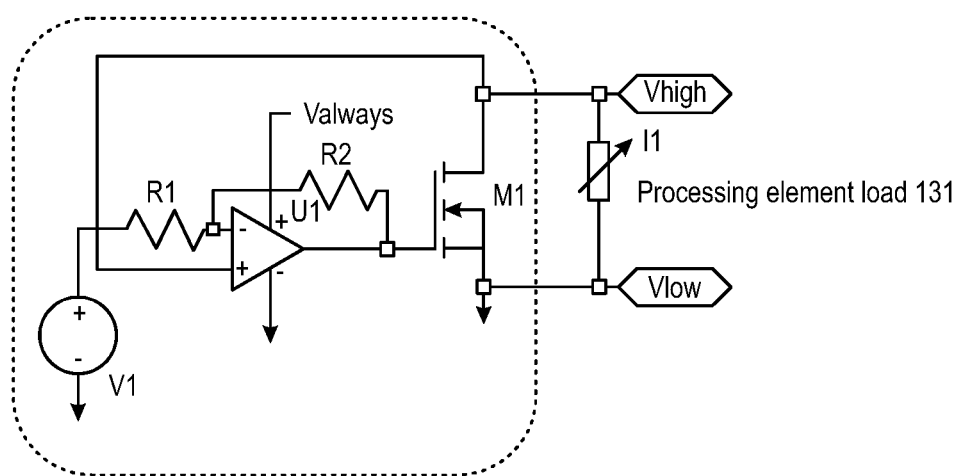
FIG. 2A illustrates an example circuit diagram of a switching circuit of each power management circuit of a plurality of power management circuits.

FIG. 2A illustrates an example circuit diagram of switching circuit 200. The switching circuit 200 of FIG. 2A is an example of any switching circuit 123 in any example and may be implemented in any example. Each power management circuit 121 should be able to guarantee a minimum series load of the processing element 131 across a stack of power management circuits 121. Hence, the switching circuit 200 is arranged to provide this when a processing element 131 is enabled or disabled. Ideally, each switching circuit 200 would have a constant voltage drop across a first transistor-based element (or FET) M1, which could be modelled as an ideal Zener diode across a power low rail Vlow and a power high rail Vhigh, paralleling a load I1 of the processing element 131.

The switching circuit 200 comprises an inverting operational amplifier (op amp) U1. This may be referred to as an amplifying element. The op amp U1 comprises an output which is fed back to a negative or inverting input of the op amp U1 through a second resistor R2. An input signal V1 is applied to the inverting input of the op amp U1 through a first resistor R1. The input signal V1 is a second control signal 161 supplied by one or more power controllers 124. The input signal V1 may be approximately equal to a differential voltage across the power management circuit Vdiff (not shown in FIG. 2A) and may be a reference voltage derived from a second power supply Valways or a bandgap reference.

A positive pin of the op amp U1 is connected to the second power supply Valways. The output and input signals of the op amp U1 are out of phase. The value of the first resistor R1 is much less than the value of the second resistor R2, resulting in a high gain. The op amp U1 therefore amplifies the second control signal 161 such that it is suitable for controlling the first transistor-based element M1 and bypassing the processing element 131 when necessary. The first transistor-based element M1 may be referred to as a switching element. The output of the op amp U1 is fed into the first transistor-based element M1 for power normalization and protection of the processing element. The switching circuit 200 protects the processing element 131 in the event of a processing element 131 halt by enforcing a power envelope via the first transistor-based element M1. The first transistor-based element M1 may be a large power MOSFET. The power envelope results in the transistor-based element M1 dissipating any excess current not being used by the processing element 131 if the current draw of the processing element 131 decreases by e.g. halting.

The power normalization and protection mechanism can also be described in terms of the first transistor-based element M1, or the FET. When the FET is fully closed (or the FET is fully turned on), and the differential voltage across the power management circuit Vdiff is equal to 0, the processing element 131 is not processing. In other words, the switching circuit 123 has switched to an inactive state where power sufficient to enable processing is not provided to the processing element 131 because the available power from the power supply 110 has decreased. This can also be described as a bypass-idle mode, or when the processing element 131 is disabled. When the FET is fully open (or the FET is off) and the differential voltage across the power management circuit Vdiff is sufficient to enable processing, or the processing element 131 is carrying a sufficient amount of current, the processing element 131 is processing. In other words, the switching circuit 123 has switched to an active state. This can also be described as a normal-run mode, or when the processing element 131 is enabled. When the FET is simulating the load of the processing element 131 because the processing element 131 has failed, is not using full power, or is restarting, the FET is in linear mode and will dissipate power. This can also be described as a hot-idle mode and may occur when overheating of a specific processing element 131, or an area of the overall system where certain processing elements 131 are located, has occurred.

As described above in relation to FIGS. 1A-1B, the second power supply Valways is not lost during bypass-idle mode, or when the switching circuit 200 is in the inactive state. The second power supply Valways is a feature of the power management system 120 when the power supply 110 is a first power supply. The second power supply Valways is arranged to deliver a low level of power to the plurality of power management circuits 121 sufficient to enable control of each power management circuit 121. When a power management circuit 121 is taken out of the stack due to decreased power supply 110, a corresponding power controller 124 is still able to communicate due to the low level of constant power and/or current provided by the second power supply Valways. The level of power for enable control of the power management circuit 121 may even be less than the power sufficient to enable processing by a processing element. In this manner, the second power supply Valways is independent of the first power supply 110. The second power supply Valways may always be present when the power management system 120 and/or the computing system 130 are operational. This is advantageous because the power controller 124 can still enable the processing element 131 while the power management circuit 121 is saving energy in the stack because current from the first power supply 110 is not being drawn into the processing element 131. The second power supply Valways may be in the same voltage domain as a corresponding processing element 131. The first control signal 160 may be provided to the connector 122 of the power management circuit 121, and therefore the corresponding processing element 131, in the local voltage domain of the corresponding processing element 131. As described herein, there may be capacitive coupling to create the second power supply Valways, so the power supply 110 may be supplied as a differential voltage to each power management circuit 121. The differential voltage may be supplied to the connector 122 in the local voltage domain of the processing element 131. Capacitive coupling may reset the voltage domain of a power management circuit 121 or a processing element 131.

The stack of power management circuits 121 may start operation when a total voltage across the plurality of power management circuits Vstack (not shown in FIG. 2A) is larger than or equal to the differential voltage across a power management circuit Vdiff, e.g. when clouds over the photovoltaic clear or become thinner, the power management system 120 is able to enable one or more processing elements 131. As the total voltage across the plurality of power management circuits Vstack increases, more switching circuits 200 are able to switch to an active state and supply power sufficient to enable processing to a corresponding processing element 131. In other words, more power management circuits 121 in the stack will turn "on" by opening the FET of a corresponding switching circuit 200 and therefore allowing current to flow through a corresponding processing element 131 (i.e. the processing element 131 dissipates the current). Conversely, as the total voltage across the plurality of power management circuits Vstack decreases, switching circuits 200 will start to switch to an inactive state and stop supplying power sufficient to enable processing to a corresponding processing element 131. In other words, more power management circuits 121 in the stack will turn "off" by closing the FET of a corresponding switching circuit 200 and therefore stopping current to flow to a corresponding processing element 131 and halting operation of the processing element 131.

When the number of enabled processing elements 131 dynamically changes to track the power extraction from the power supply 110 based on one or more characteristics of one or more of: a thermal characteristic, one or more faults of a processing element 131, a current state of processing of a processing element 131, or a current draw of a processing element 131, the characteristics should be more closely considered. To consider thermal management (i.e. tracking which processing elements 131 are hot and need to be disabled, and replacing them with processing elements 131 that have not been used in a while so can be enabled), fault removal (i.e. when a processing element 131 is not in normal operation), and tolerance of each processing element 131 varying in voltage (i.e. tracking the tolerances of the processing elements 131 because they each have different built in tolerances), the power management system 120 may have the following number of power management circuits 121, where Vstack is the total voltage across the plurality of power management circuits stack, Vdiff is the differential voltage across a power management circuit, and N is equal to a number of extra processing elements:

$$\frac{Vstack}{Vdiff} + N \qquad \text{(Equation 1)}$$

Figure 2B:
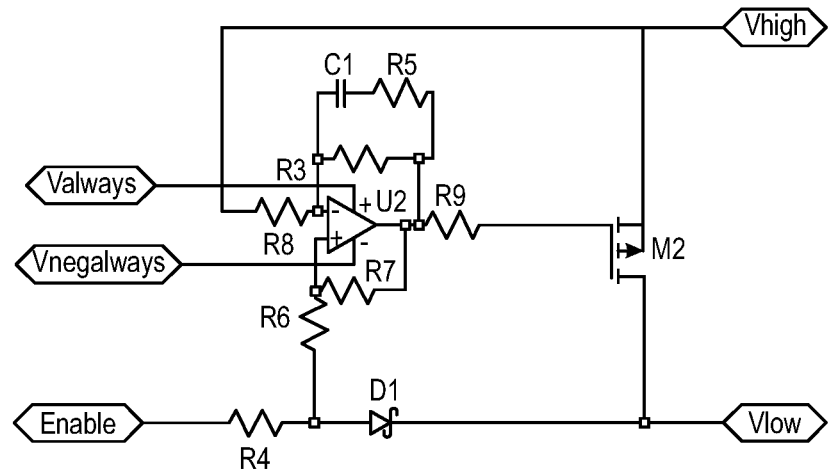
FIG. 2B illustrates an example circuit diagram of a switching circuit of each power management circuit of a plurality of power management circuits.

FIG. 2B illustrates another example circuit diagram of a switching circuit 201 of each power management circuit 121 of the plurality of power management circuits 121. The switching circuit 201 of FIG. 2B is an example of any switching circuit 123 in any example and may be implemented in any example. Similarly, to the switching circuit 200 of FIG. 2A, the switching circuit 201 of FIG. 2B is essentially an ideal diode with a power FET M2, or second transistor-based element M2 (sometimes referred to as a switching element) and provides power normalization and protection of a processing element 131 (not shown in FIG. 2B).

Where a processing element 131 would be observed at the output, a power high rail Vhigh and a power low rail Vlow parallels the output where there is a fixed voltage drop. When there is a voltage across the power high rail Vhigh and the power low rail Vlow, an op amp U2 conducts very strongly. The op amp U2 (sometimes referred to as an amplifying element) has both positive feedback due to a sixth resistor R6 and seventh resistor R7, and negative feedback due to an eighth resistor R8 and a third resistor R3 in parallel with a fifth resistor R5 and a capacitor C1. There is also a fourth resistor R4 at an enable input connected to a fixed reference diode D1 at a node. The diode D1 may set the voltage limit of the second transistor-based element M2, the second transistor-based element being fed the output of the op amp by a ninth resistor R9. The purpose of the capacitor C1 and the resistors R3, R4, R5, R6, R7, R8, R9 is to provide filtering. The diode D1 may alternatively be a bandgap reference or a Digital-to-Analogue Converter (DAC) output.

A second power supply Valways may always be present when the power management circuit 121 is operational and before applying the power supply 110. An inverse second power supply Vnegalways may be present to provide biasing for the second transistor-based element M2. The enable signal goes high according to the second voltage supply Valways to engage a processing element 131, and in this manner, the switching circuit 201 dissipates excess current not being used by a processing element 131. The enable signal goes low according to the strong biasing inverse second voltage supply Vnegalways to disengage (or bypass) the processing element 131, resulting in no processing (or hashing). The inverse second voltage supply Vnegalways may not be required. When the switching circuit 201 is in an inactive state, the second transistor-based element M2 is driven to complete saturation due to the positive terminal of the op amp U2 being driven low. Software control may also enable or disable processing elements 131 by driving transistor-based elements M1, M2 to complete saturation when the power supply 110 decreases.

Figure 3:
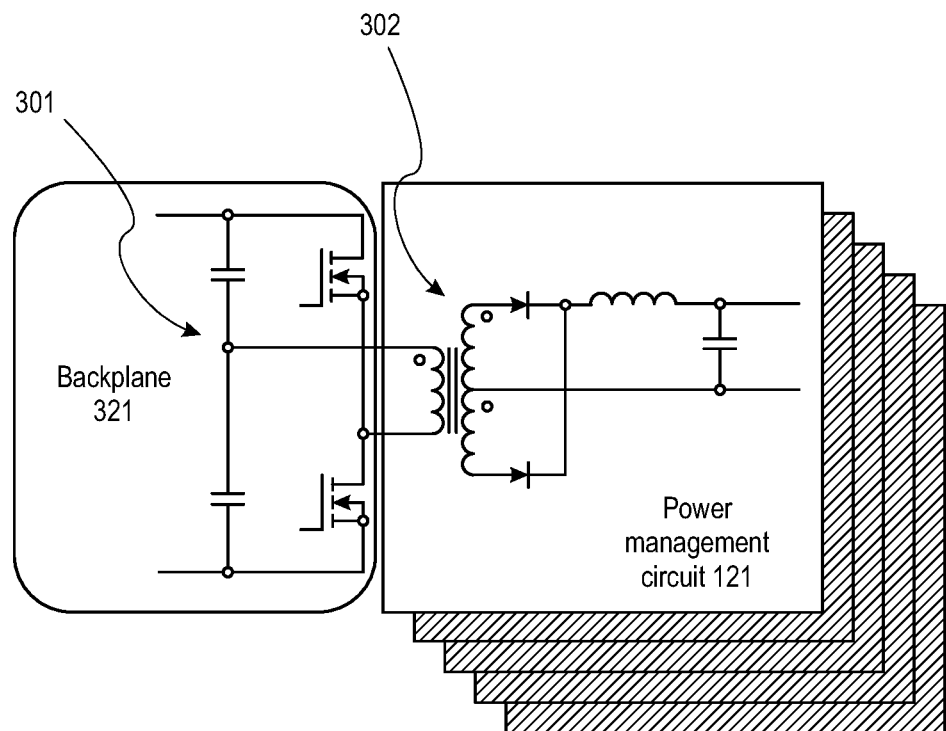
FIG. 3 illustrates an example circuit diagram of supplying each power management circuit of the plurality of power management circuits with a level of power sufficient to enable control of each power management circuit.

FIG. 3 illustrates an example circuit diagram 300 of supplying each power management circuit 121 of the plurality of power management circuits 121 with a level of power sufficient to enable control of each power management circuit 121. As described above, the level of power sufficient to enable control of each power management circuit 121 is described as the second power supply Valways. The second power supply Valways may be a level of (DC) Vdd sufficient to enable controller logic via the first and second control signals 160, 161, e.g. throttle control, modulation control, management logic, communication control, and/or management control, even when a switching circuit 201 of the power management circuit 121 is in an inactive state. The second power supply Valways may be a low power rail.

In the example circuit diagram 300 of FIG. 3, a transformer 302 in the power management circuit 121 and an isolated supply 301 in a backplane 321 are used to provide the second power supply Valways. A backplane may be described as a group of electrical connectors in parallel with each other, and/or an electrical connector that joins several electrical circuits together. In this example, AC power is provided to each power management circuit 121 where it is rectified and DC referenced to the local ground. If the AC power supply is not isolated by a transformer 302 nor conditioned to DC, inefficiencies could be spared. An alternative to having a DC supply is AC rectified mains.

Other examples of providing the second power supply Valways include using a local super-capacitor that is maintained by the main power supply 110 whenever a switching circuit 123 of power management circuit 121 is in an inactive state or using a capacitor charge pump method. The capacitor charge pump method may decouple a power domain or double a voltage, and may be useful at low load levels. During the capacitor charge pump method, power management circuits 121 should be able to tolerate differential voltages because a DC voltage is supplied differentially to each power management circuit 121. In an example where each power management circuit 121 has a set of opto-isolated FETs or insulated-gate bipolar transistors (IGBTs) that can engage or disengage from a local capacitor, a different pair of FETs or IGBTs switch in this capacitor to pump charge onto the second supply voltage Valways when the local capacitor is not being charged. This switching can occur synchronously across the full stack to even out draw on the DC line. In other words, a capacitor is continuously switched from being attached to a DC voltage to charge, to a load to discharge. As at least two capacitors are used, at least one capacitor is being charged or is discharging at any one time.

Figure 4A:
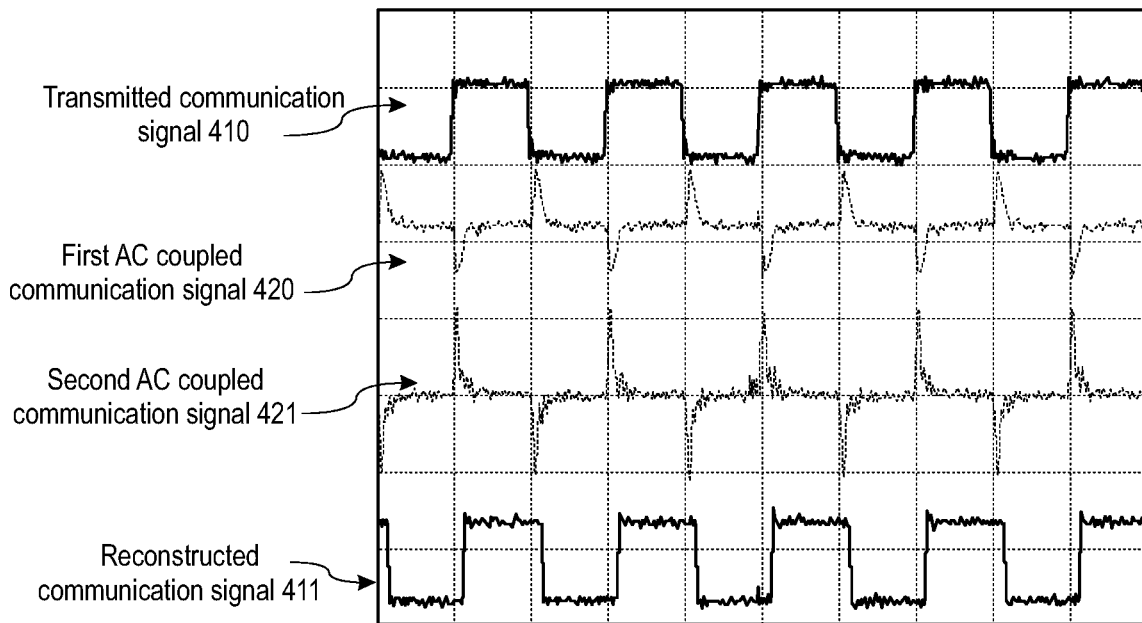
FIG. 4A illustrates an example graph displaying communication, such as sending a communication signal, throughout the plurality of power management circuits using AC coupled signals.
Figure 4B:
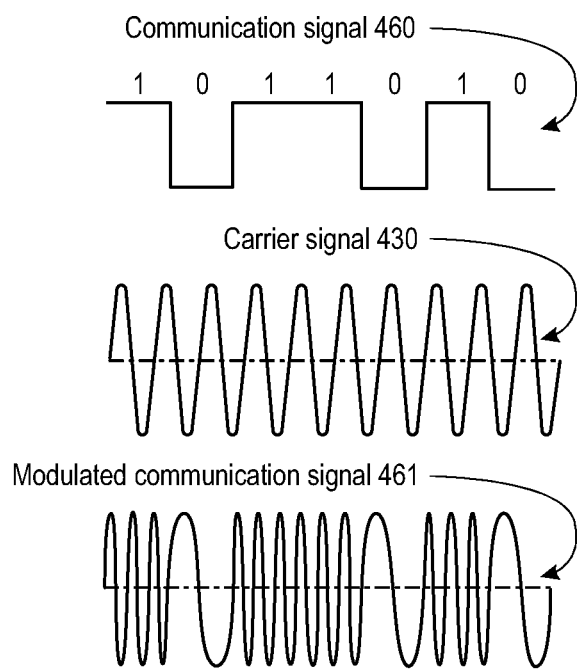
FIG. 4B illustrates an example graph displaying communication, such as sending a communication signal, throughout the plurality of power management circuits using carrier-based signaling.

FIG. 4A illustrates an example graph 400 displaying communication, such as sending a communication signal, throughout the plurality of power management circuits 121 using AC coupled signals, and FIG. 4B illustrates an example graph 401 displaying communication, such as sending a communication signal, throughout the plurality of power management circuits 121 using carrier-based signaling. The communication signal may be either or both of the first and second control signals 160, 161. The connection of neighboring power management circuits 121 may be through the upper connector 150 and/or lower connector 151. When sending a communication signal through the upper connector 150 and lower connector 151 of the stack of power management circuits 121, differential signaling occurs between the power management circuits 121. Differential signaling is a method for electrically transmitting information, in this case communication signals, using two complementary signals. The complementary signals used in the example of FIG. 4A are a first and second AC coupled communication signal 420, 421, and the complementary signals used in the example of FIG. 4B are a communication signal 460 and a carrier signal 430 to provide a modulated communication signal 461.

It is advantageous to use differential signaling to transmit communication signals because it helps to maintain the signal-to-noise ratio (SNR) of the communication signal. Additionally, as the communication signals are provided to the power management circuits 121 when the low power, second power supply Valways is input without the first power supply 110, differential signaling provides the advantage of operating at lower voltages. This further results in reduced power consumption and reduced EMI emissions.

In FIG. 4A, the transmitted communication signal (here a DC coupled signal) 410 is AC coupled to produce the first AC coupled communication signal 420 of a first power management circuit. The first AC coupled communication signal 420 is then transmitted to a second power management circuit, producing the second AC coupled communication signal 421. The second AC coupled communication signal 421 is then reconstructed to produce a reconstructed communication signal 411 at a connector of the second power management circuit in the local, or native, voltage domain of a corresponding processing element connected to the connector. AC coupling allows flexible installation and reduces problems with updates to the power management system.

The AC coupling occurs within one voltage domain. In this implementation, each power management circuit 121 would have a voltage domain wherein AC coupling occurs. This is one of various ways to have a capacitively coupled bus. Each power management circuit 121 sends an AC coupled communication signal to a neighboring power management circuit 121 through the use of AC coupled communication lines (possibly through the upper connector 150 and/or lower connector 151).

In FIG. 4B, the carrier signal 430, or more specifically an AC carrier signal 430, is modulated with the communication signal 460 (which could be described as either or both of the first and second control signals 160, 161), or more specifically a DC communication signal 460. The result is the modulated communication signal 461 which enables the transmission of the communication signal 460 from a first power management circuit to a second power management circuit via the carrier signal 430. Carrier-based signaling enables dramatically higher speed communications of communication signals between neighboring power management circuits with reduced dissipation of power. Carrier-based signaling does not rely on DC bias.

The topology and interfacing at the physical level is the same for the examples in FIGS. 4A and 4B. A modulated signal is handled like a transmission line with AC coupling.

In some embodiments, within the stack of power management circuits 121, power management circuit addressing may be automatic so each power management circuit 121 knows where it is in the chain of connected power management circuits 121. Each communication signal may go up and down via AC coupling. Each communication signal may be buffered on each power management circuit 121. Buffering is advantageous because each power management circuit 121 is able to initialize up the "chain" of connected power management circuits 121, where the first and last power management circuits 121 to be initialized are connected to the terminals of the power supply 110. The stack may comprise any number of power management circuits 121 for any total power supply 110.

The last power management circuit 121 in a stack comprising a plurality of power management circuits 121 which is directly connected to a terminal of the power supply 110 may be connected to software to enable a boundary scan. A boundary scan is a method for testing interconnects, or wire lines, on PCB modules. As previously described, each power management circuit 121 may comprise a PCB module. This helps to solve any problems or issues within the hardware. If increased bandwidth is required, there may be a plurality of communication channels between neighboring power management circuits 121 to enable the flow of a plurality of communication signals. The communication signals may be advantageously synchronous, meaning that the communication signals are transferred between at least two power management circuits, in real time. Synchronous communication may use a Serial Peripheral Interface (SPI) or an Inter-Integrated Circuit (I2C).

Figure 5:
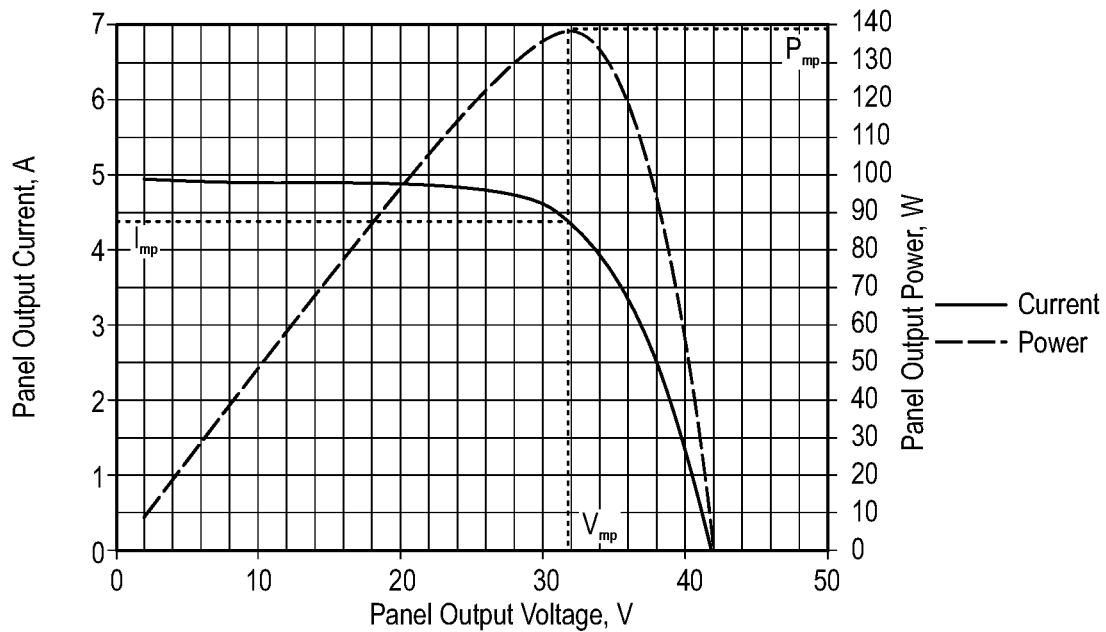
FIG. 5 illustrates an example graph displaying how the power management system may be used to track a solar power supply to improve a power extraction by the power management system.

FIG. 5 illustrates an example graph 500 displaying how the power management system may be used to track a solar power supply 110 to improve a power extraction by the power management system. The graph 500 of FIG. 5 has solar panel output voltage on an x-axis, and solar panel output current on the left-hand y-axis and power on the right-hand y-axis. Current is shown with a solid line and power with a dashed line. The maximum theoretical power extraction may be identified using the dotted line on the graph, where an ideal current Imp and ideal voltage Vmp are identified after locating a power peak providing a maximum power Pmp. The current starts at around 5 A when the output voltage is 2V, reduces from 5 A to approximately 4.4 A when the output voltage increases from 2V to 32V, and further reduces from approximately 4.4 A to 0 A when the output voltage increases from 32V to 40V. The power starts at around 10 W when the output voltage is 2V, increases from 10 W to 140 W when the output voltage increases from 2V to 32V, and then reduces from 140 W to 0W when the output voltage increases from 32V to 40V. Therefore, it can be seen that a maximum power Pmp can be extracted when the panel output voltage Vmp is 32V and the panel output current Imp is around 4.4 A. This is just an example, and when photovoltaics are used, solar panels vary in terms of their individual max power IV (current-voltage) point. Battery charging systems, like solar charge controllers, automatically track loading to extract a an increased amount of power from a given panel. When determining an increased power extraction from solar panels of the power supply 110, it should be considered that the power supply 110 may draw an increased amount of current from each solar panel, causing a voltage to collapse and reduce to 0V due to DC resistance within each solar panel.

Applying this to the present example, if the power supply 110 is a renewable energy source such as solar energy, as the sun ebbs and flows with the clouds or weather changes, changes in the number of power management circuits with switching circuits 123 in an active state may be used to track an increased power extraction, like a solar charge controller. It will also be appreciated that while a solar power system is tracked in FIG. 5, other renewable energy sources may be tracked in the same manner.

Figure 6A:
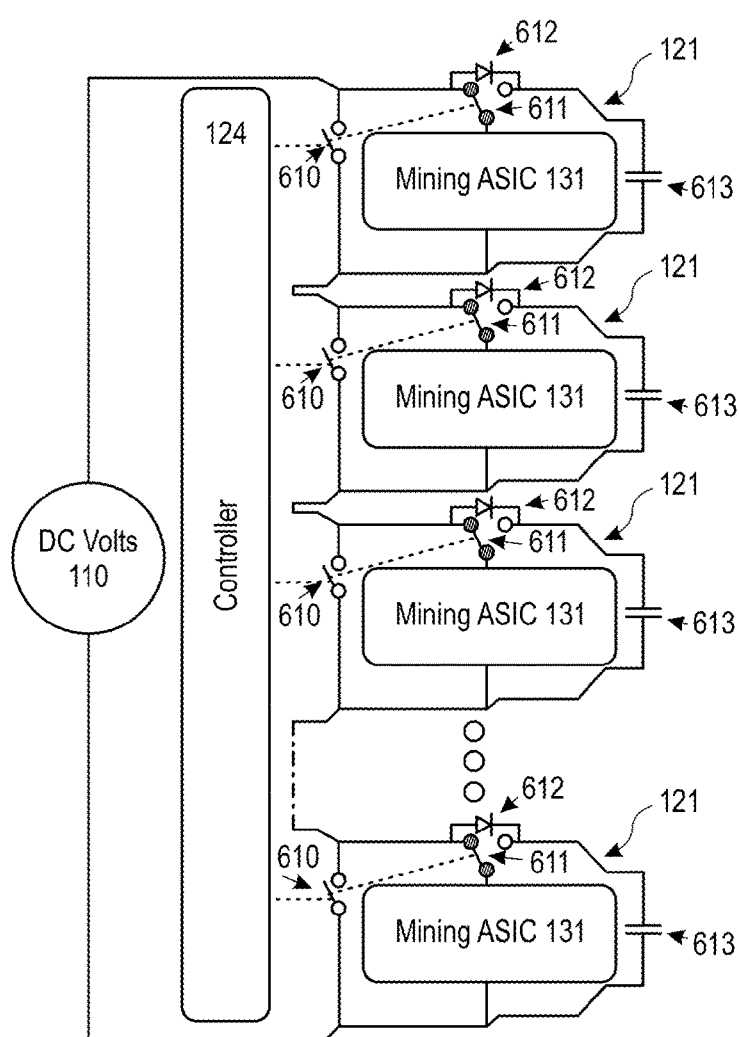
FIG. 6A illustrates an example diagram of a power management system comprising a plurality of power management circuits.

Each of FIGS. 6A-7B illustrate an example circuit diagram 600, 601, 700, 701 with varying implementations of the power management system 100 or any part of the power management system 100 described herein. A diode 612 in each of the circuit diagrams of FIGS. 6A, 7A and 7B assumes that the mining ASICs (processing elements 131, 710, 711) require a constant, low level second power supply Valways, even when a switching circuit 123 (shown in FIG. 6B) switches to an inactive state. Hence, the Vdd supply may be turned off without major reinitialization required by the processing elements 131, 710, 711 due to the second power supply Valways. In some examples, the power management circuit 121, 740, 741 writes to a register of the processing element 131, pauses a PLL and turns off a clock to stop the power usage of a processing element 131, while using a low power supply Vdd via a capacitor 613 and diode 612 (as shown in FIGS. 6A, 7A and 7B).

FIG. 6A illustrates an example power management system 600 comprising a plurality of power management circuits 121. The power management system 600 comprises the features of the power management system 100 described herein. The power management system 600 also comprises a central power controller 124. Each power management circuit 121 comprises two switches 610, 611, a diode 612 and a capacitor 613, and is connected to a mining ASIC (processing element 131) through a connector 122 (not shown in in FIG. 6A as earlier circuit diagrams show the connector 122). In fact, the two switches 610, 611, the diode 612, and the capacitor 613 of each power management circuit 121 are comprised by a switching circuit 123 of the corresponding power management circuit 121. Although only four power management circuits 121 are shown, there could be any number of power management circuits 121.

In this manner, the controller 124 determines whether or not a switching circuit 123 of one of the plurality of power management circuits 121 should be in an active state or an inactive state based on a characteristic of a power supply 110 to the power management system 600, and a characteristic of at least one of: the power management system 600, a mining ASIC (processing element 131), or a computing system 130 comprising the mining ASICs (processing elements 131), hence there are two switches 610, 611 in the switching circuit 123. In other embodiments, the central power controller 124 may instead be one or more power controllers 124 comprised by each power management circuit 121 or comprised by the power management system 600. Second control signals 161 are sent from the central power controller 124 to the switching circuits 123 and this is shown with a dotted line.

Each mining ASIC of each power management circuit 121 is provided with a low voltage supply (the second power supply Valways), or more specifically, with a Vdd supply between 0.6V and 0.85V. Each ASIC (processing element 131) may be provided with a Vdd supply of approximately 0.71V. If the power required per processing element 131 is 11 W, a 45 mΩ resistor is used. The total voltage across the plurality of power management circuits Vstack may not increase beyond n multiplied by Vdd, where n is equal to the number of ASICs (processing elements 131). The ASICs initialize very quickly. Therefore, a UART communication protocol can be used to write small numbers of bytes to each power management circuit 121 to allow and stop current flowing through each mining ASIC (processing element 131), effectively gating their power consumption. Power gating is a method of reducing power consumption by shutting off current to parts of a circuit that are not in use, or in this case, stopping current flowing to the processing units 131 connected to the plurality of power management circuits 121. To keep effective load balancing, a voltage across each ASIC (processing element 131) is monitored by the controller 124. A current sinking transistor (i.e. the switch 611) is engaged in each switching circuit 123 of each power management circuit 121 to dissipate excess power not used by each ASIC (processing element 131). In other words, each of the plurality of power management circuits 121 is configured to modulate a power usage of each processing element 131 arranged to be connected to each of the plurality of power management circuits 121 when a corresponding switching circuit 123 is in an active state.

For a given power supply 110, the plurality of mining ASICs (processing elements 131) can operate, i.e. the mining ASICs (processing elements 131) can be enabled or a corresponding switching circuit 123 can be in an active state, such that the required Vdd (or the power sufficient to enable processing) is maintained. If Vdd decreases past a power sufficient to enable processing for some power management circuits 121, the ASICs (processing elements 131) connected to these power management circuits 121 are removed from the chain by the controller 122 by sending a second control signal 161 to a corresponding switching circuit 123 to switch to an inactive state. In this manner, the length of the series chain is dynamic and the number of power management circuits 121 in an active state is dynamic. Conversely, if Vdd increases, more ASICs (processing elements 131) can be provided with power sufficient to enable processing. Therefore, engaging more mining ASICs (processing elements 131) by allowing the current (and the required Vdd) to pass through each ASIC (processing element 131). The stack current may be set by the ASICs (processing elements 131), and a voltage requirement may be enforced by the power management system 600.

Figure 6B:
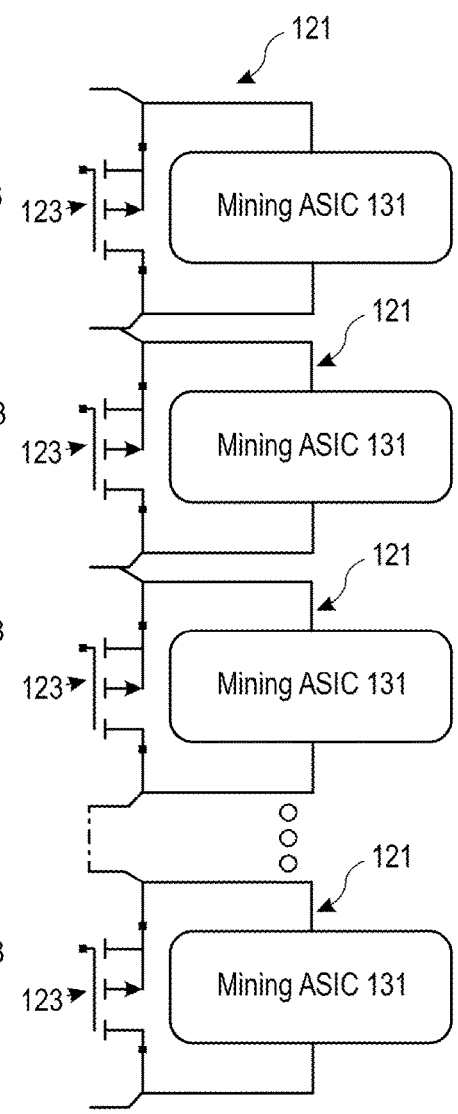
FIG. 6B illustrates an example diagram of a plurality of power management circuits of the power management system.

FIG. 6B illustrates an example diagram of a plurality of power management circuits 121 of the power management system 601. Each mining ASIC (processing element 131) or set of n ASICs sharing a voltage domain, is connected to a switching circuit 123 through a connector 122 (not shown in FIG. 6B) in a power management circuit 121 of the power management system 601. Each switching circuit 123 comprises a transistor-based element, and more specifically, a P-MOS FET. This enables a dynamic length of the stack of power management circuits 121 because the power management circuits 121 are essentially modular so they have the ability to control the power usage of each ASIC (processing element 131).

As already described, the stack current is set by the ASICs (processing elements 131), and, separately, the power management system 601 enforces the voltage requirement by conducting as much current as is necessary through each ASIC (processing element 131). Only current from imbalances may be carried by the switching circuit 123, as the switching circuit 123 acts as protection for each ASIC (processing element 131). In other words, the switching circuit 123 will only dissipate excess power when the input voltage exceeds a set value. If all ASICs (processing elements 131) are operating at the same power, then the chain of ASICs is not imbalanced, and current does not flow through the PFET. If the voltage of one ASIC rises (i.e. the ASIC is using less current), the PFET conducts slightly to dissipate the current not being used by the ASIC such that the differential voltage remains constant. Conversely, if the voltage across an ASIC decreases (i.e. the ASIC is drawing more current than the other ASICs or more current than a previous state), the voltage across the other ASICs would effectively rise proportional to the total number of ASICs in the chain. This engages the power protection in the other power management circuits, i.e. the PFETs conduct to dissipate current. In other words, in some examples the ASIC that draws the most current will set the total current for the loop, and every other ASIC should draw that amount of current to enable all of the PFETs to dissipate zero current.

Due to the power management system 601, processing elements 131 may be rapidly and dynamically rotated in and out of the computing system 130 (not shown in FIG. 6B), i.e.

switching on or off a corresponding FET (switching circuit 123), to improve load and power balancing across the full ASIC stack. Further, the power management system 601 dynamically switches mining ASICs (processing elements 131) in the series stack.

FIGS. 7A-7B illustrate an example diagram of a power management system 700, 701 comprising a plurality of power management circuits. FIG. 7A illustrates an example 700 with three power management circuits 740 in an active state and one power management circuit 741 in an inactive state, whereas FIG. 7B illustrates an example 701 with one power management circuits 740 in an active state and three power management circuits 741 in an inactive state. The example power management system 700 provided in FIGS. 7A-7B use the same configuration as the power management system 600 of FIG. 6A, however, in FIGS. 7A-7B, varying levels of power supply are input to the power management system 700. Each of the power management circuits 740, 741 each comprise the same diode 612 and capacitor 613 as those in FIG. 6A for the low level second power supply Valways. Although only four power management circuits are shown in each of the examples, there could be any number of power management circuits. Second control signals 161 are sent from the central power controller 124 to the switching circuits 123 and this is shown with a dotted line.

The active power management circuits 740 each comprise a first open switch 720, and a first closed switch 730. The first open switch 720 is open and the first closed switch is closed 730 due to a second control signal 161 (shown with a dotted line) from the controller 124. The second control signal 161 determines whether a switching circuit is in an active or an inactive state and in this example, the switches 720, 730 are in an active state. A flow of current from the DC supply 110 is shown using a bold, solid line and can be seen flowing to the first closed switch 730 of each of the active power management circuits 740, through a mining ASIC 710, and to the next power management circuit. In other words, the switching circuit is in an active state and the mining ASIC has sufficient power to hash data.

The inactive power management circuits 741 each comprise a second open switch 731, and a second closed switch 721. The second open switch 731 is open and the second closed switch is closed 721 due to the second control signal 161 (shown with a dotted line) from the controller 124. In these circuit diagrams, the second open switch 731 is shown as 'open' in that no current flows through the mining ASIC 711. The second open switch 731 disengages the mining ASIC 711 and allows current to bypass the mining ASIC 711. The second control signal 161 determines whether a switching circuit is in an active or an inactive state and in this example, the switches 721, 731 are in an active state. A flow of current from the DC supply 110 is shown using a bold, solid line and can be seen flowing to the second closed switch 730 to the next power management circuit, completely bypassing mining ASIC 711 and engaging the bypassing circuitry shown with a dashed line and comprising the capacitor 613. In other words, the switching circuit is in an inactive state and the mining ASIC does not have sufficient power to hash data.

Each of FIGS. 7A-7B illustrate the same power management system, however, the weather conditions in each figure differ if the DC power supply is photovoltaic. In FIG. 7A, the clouds are ebbing more than they are flowing in front of the sun and the solar panels are getting more sun, resulting in an increased power supply. In this example, there is enough power supply 110 to power the majority of the mining ASICS 710, 711 (there are more engaged mining ASICs 710 than disengaged mining ASICs 711). In FIG. 7B, the clouds are flowing more than they are ebbing in front of the sun, and so the solar panels are not getting as much sun as before, resulting in a decreased power supply. In this example, the power supply 110 is not sufficient to allow processing on the majority of the mining ASICS 710, 711, so many of the ASICs 711 are being bypassed by corresponding switching circuits (there are more disengaged mining ASICs 711 than engaged mining ASICs 710). These diagrams reinforce the idea that the ASICs 710, 711 are dynamically rotated in and out of the computing system 130. One or more ASICs in each of FIGS. 7A-7B are dynamically rotated in and out of the computing system 130, depending on a variable input power supply 110.

Figure 8A:
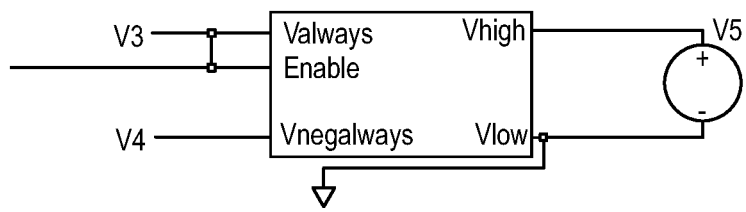
FIG. 8A illustrates an example circuit diagram of a voltage clamp of a switching circuit of one power management circuit.

In any of FIGS. 8A-8G, the voltage clamp circuit referred to may also be described as a switching circuit 123. FIG. 8A illustrates an example circuit diagram of a voltage clamp 800 of a switching circuit 123 of one power management circuit 121. The voltage clamp should be able to sink all current (i.e. allow all current to flow) to enable processing of a processing element 131 (not shown in FIG. 8A). The diagram 800 provides two input voltages V3, V4 wherein a first input voltage V3 is provided at a second power supply Valways and an enable input, and a second input voltage V4 is provided at an inverse second power supply Vnegalways. The inverse second voltage supply Vnegalways may not be required. Where a processing element 131 might be observed (at the output), a power high rail Vhigh and a power low rail Vlow are paralleling said output where there is a voltage drop.

In the present example, the following test conditions were used: a fixed voltage drop V5 with a voltage sweep between 0V and 1V (or a periodically varying voltage between 0V and 1V); and a resistor (or load) on the output rails having a resistance of 0.005Ω. When the voltage clamp circuit is in full saturation, current increases. As previously described, a processing element 131 which might be observed between the output rails may be provided with a Vdd supply between 0.6V and 0.85V. Therefore, the voltage clamp circuit provided may limit at about 875 mV once in full saturation, wherein the current may rise to:

$$\text{Current rise} = \sim \frac{1 - 0.875}{0.005} = \sim 25A \qquad \text{(Equation 2)}$$

Figure 8B:
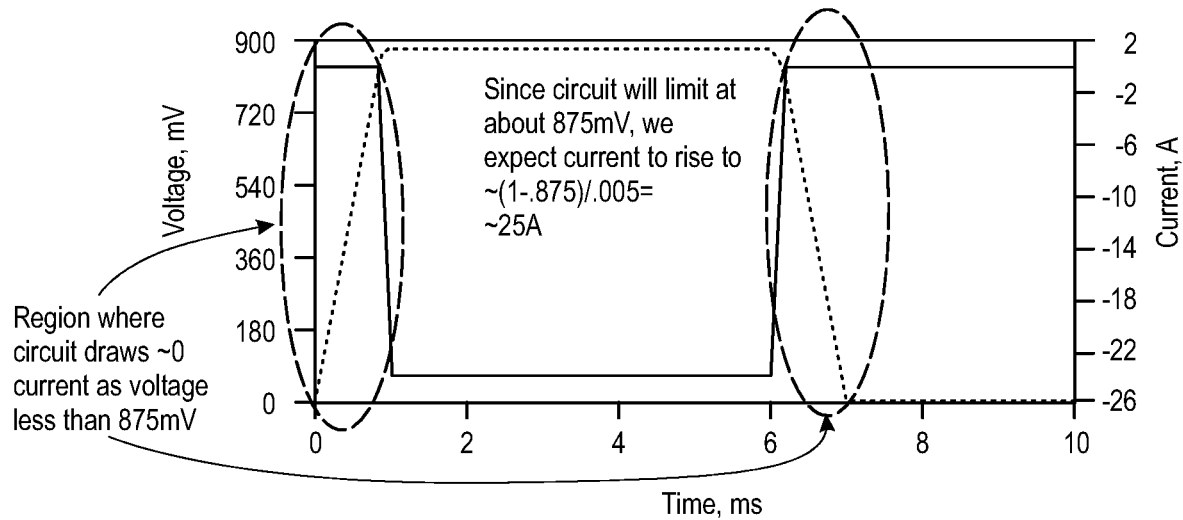
FIG. 8B illustrates an example graph of a voltage of the voltage clamp of FIG. 8A when a voltage of a power supply is supplied to the power management circuit.

FIG. 8B illustrates an example graph 801 of a voltage of the voltage clamp of FIG. 8A when a voltage of a power supply 110 is supplied to the power management circuit 121. As seen in FIG. 8B, a dashed line illustrating the voltage and a solid line illustrating a current of the voltage clamp within a switching circuit 123 of one power management circuit 121 is shown. The x-axis shows the time in milliseconds, the left-hand y-axis shows the voltage in mV and the right-hand y-axis shows the current in A. When the voltage is less than voltage at full saturation (i.e. V<875 mV), the voltage clamp circuit draws a current of approximately 0 A. When the voltage increases above a voltage at full saturation, the voltage clamp circuit draws a current (e.g. 25A). As soon as the voltage attempts to exceed a threshold (e.g. 875 mv), the voltage clamp acts like a diode. In some examples, stopping the voltage reaching a processing element 131 and taking the processing element 131 out of the chain of the power management circuit 121 may happen synchronously, however, fine tuning is required so a voltage clamp acts as a protection mechanism.

Figure 8C:
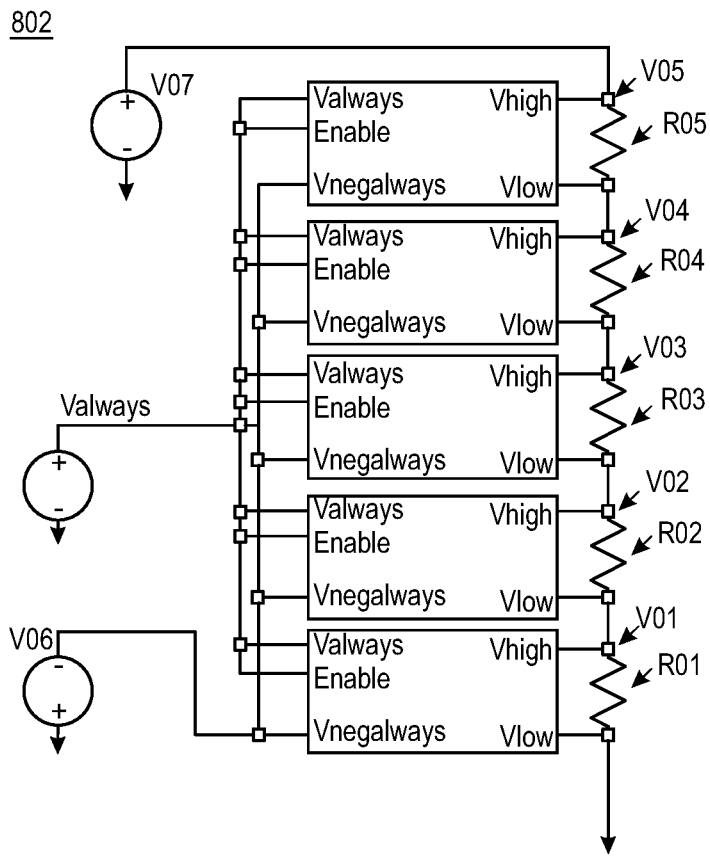
FIG. 8C illustrates an example circuit diagram of a plurality of voltage clamps of switching circuits of a plurality of power management circuits.

FIG. 8C illustrates an example circuit diagram of a plurality of voltage clamps 802 of switching circuits 123 of a plurality of power management circuits 121. The plurality of voltage clamps 802 are similar to the voltage clamp 800 provided in FIG. 8A. Similarly to FIG. 8A, the plurality of voltage clamps 802 includes a second power supply Valways and an enable input fed by a second input voltage Valways, and an inverse second power supply Vnegalways fed by a first input voltage V06. Where a processing element 131 might be observed (at the output), a voltage V07 is provided. Also, a power high rail Vhigh and power low rail Vlow are paralleling each other at the output where there is a voltage drop. The voltage drops are between each of the plurality of nodes V01, V02, V03, V04, V05. In this manner, a first voltage drop V(V01) is equal to a voltage at a first node V01, a second voltage drop V(V02-V01) is equal to a difference between a voltage at a second node V01 and the voltage at the first node V01, a third voltage drop V(V03-V02) is equal to a difference between a voltage at a third node V03 and the voltage at the second node V02, a fourth voltage drop V(V04-V03) is equal to the difference between a voltage at a fourth node V04 and the voltage at the third node V03, and a fifth voltage drop V(V05-V04) is equal to the difference between a voltage at a fifth node V05 and the voltage at the fourth node V04. In the present example, the following test conditions were used: an input voltage V3 with a voltage sweep between 0V and 5V (or a periodically varying voltage between 0V and 5V); and a plurality of resistors (or loads) R01, R02, R03, R04, R05 across the output rails of each of the voltage clamps having a resistance of either: 100 MΩ to provide a test fixture for an infinite load (ideal load); 45 mΩ to provide a test fixture for a heavy load; or asymmetric loads across the voltage clamps to provide a test fixture for imbalance. A first resistor R01 is across the first voltage drop V(V01), a second resistor R02 is across the second voltage drop V(V02-V01), a third resistor R03 is across the third voltage drop V(V03-V02), a fourth resistor R04 is across the fourth voltage drop V(V04-V03), and a fifth resistor R05 is across the fifth voltage drop V(V05-V04).

Figure 8D:
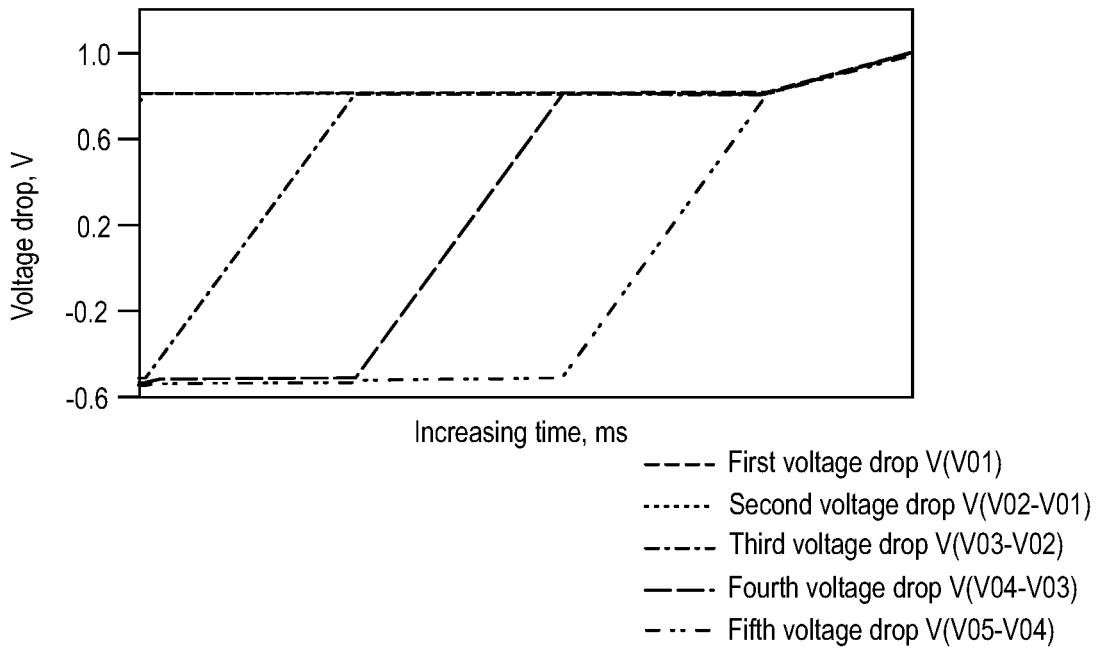
FIG. 8D illustrates an example graph of voltage drops between each voltage neighboring node of the plurality of voltage clamps of FIG. 8C when a voltage of a power supply is supplied to the plurality of power management circuits and a load is ideal.
Figure 8E:
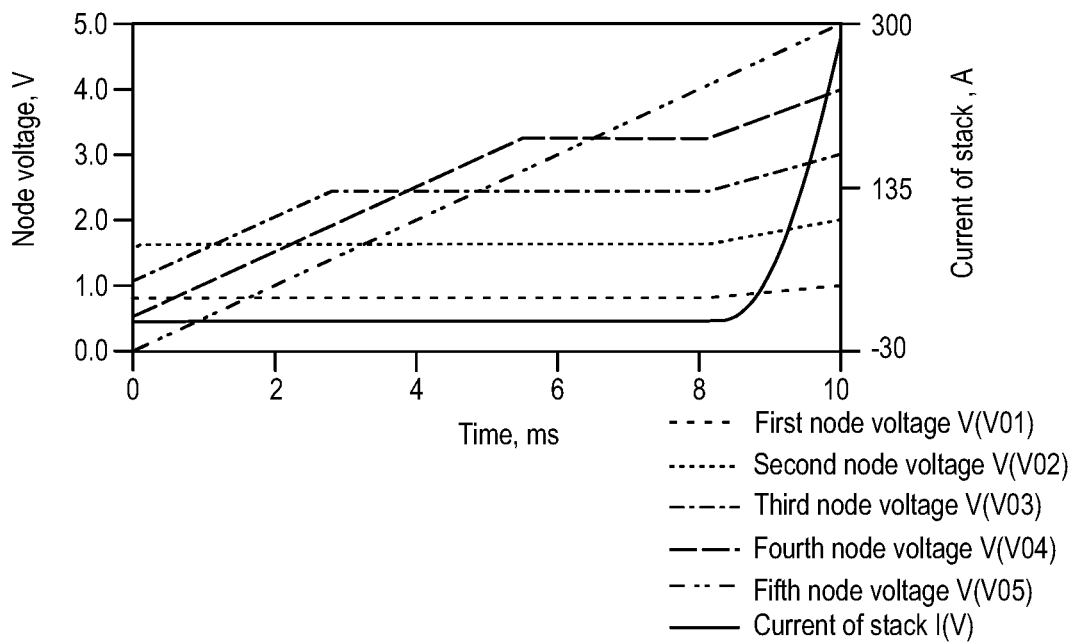
FIG. 8E illustrates an example graph of the current of the plurality of voltage clamps of FIG. 8C when a voltage of a power supply is supplied to the plurality of power management circuits and a load is ideal.
Figure 8F:
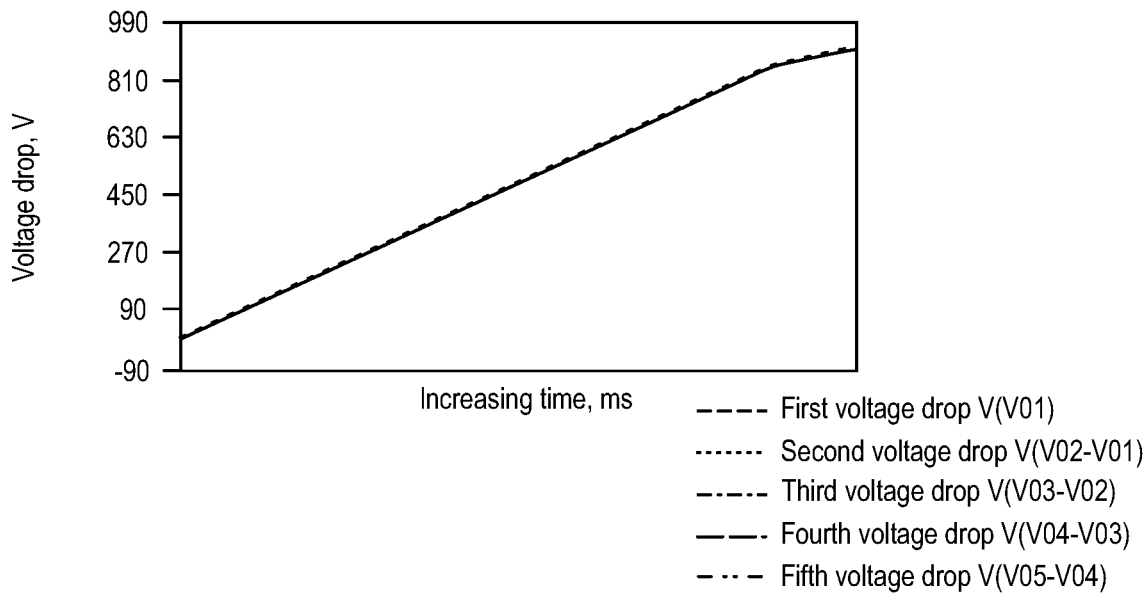
FIG. 8F illustrates an example graph of the voltage drops between each neighboring node of the plurality of voltage clamps of FIG. 8C when a voltage of a power supply is supplied to the plurality of power management circuits and a load is heavy.
Figure 8G:
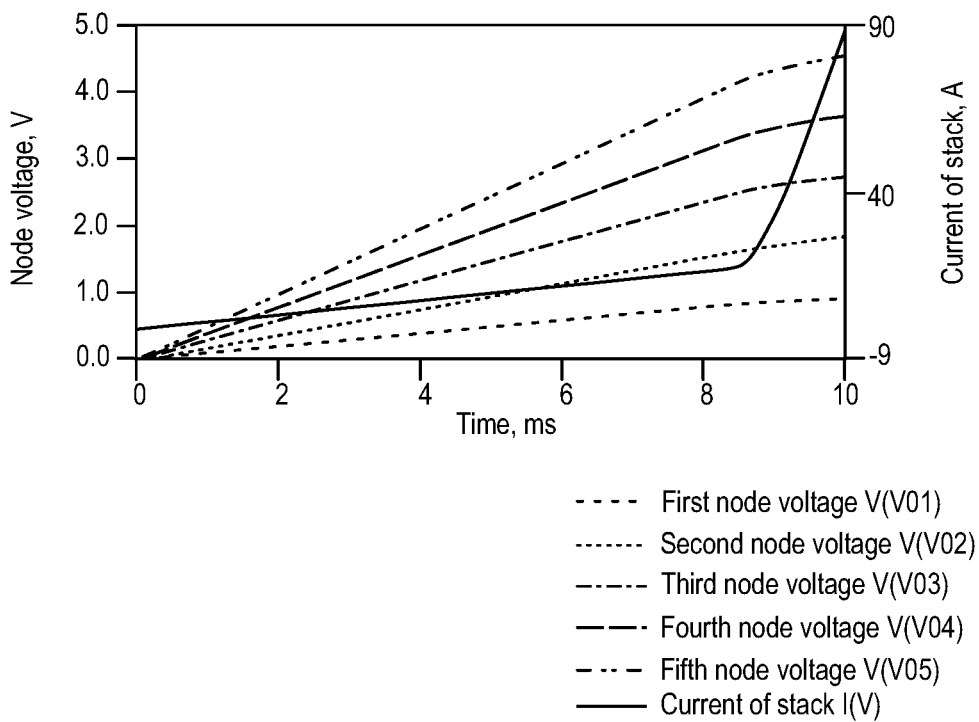
FIG. 8G illustrates an example graph of the current of the plurality of voltage clamps of FIG. 8C when a voltage of a power supply is supplied to the plurality of power management circuit and a load is heavy.
Figure 8H:
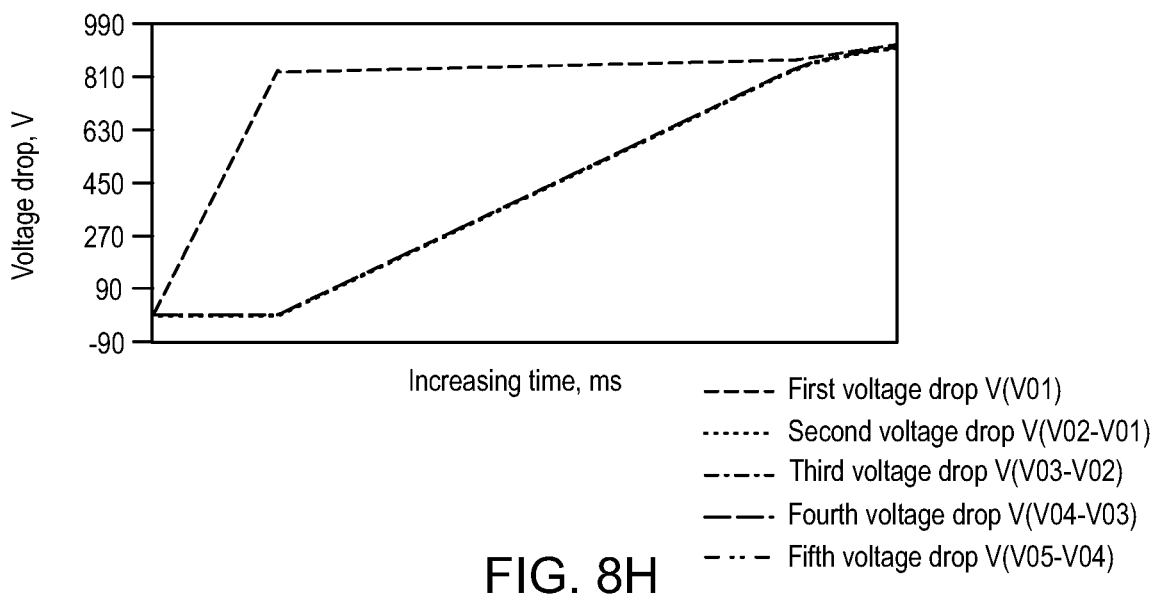
FIG. 8H illustrates an example graph of the voltage drops between each neighboring node of the plurality of voltage clamps of FIG. 8C when a voltage of a power supply is supplied to the plurality of power management circuits and a load is asymmetric.
Figure 8I:
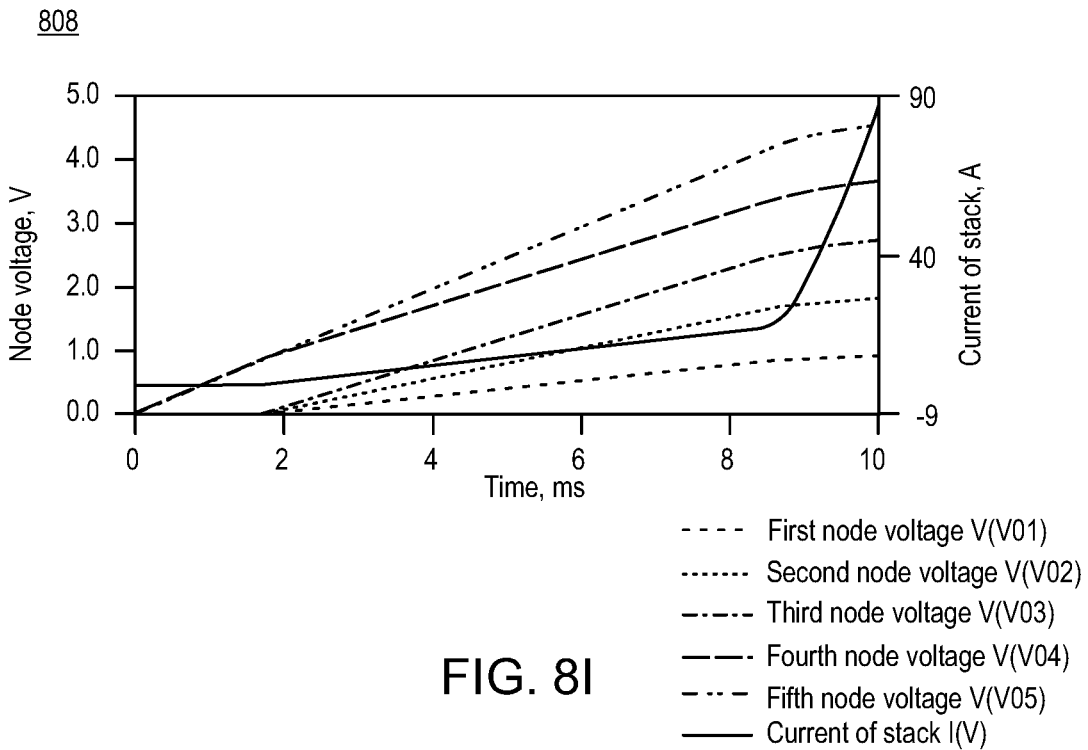
FIG. 8I illustrates an example graph of the current of the plurality of voltage clamps of FIG. 8C when a voltage of a power supply is supplied to the plurality of power management circuit and a load is asymmetric.

Each of FIGS. 8D, 8F and 8H illustrate the first voltage drop V(V01) with a dashed line, the second voltage drop V(V02-V01) with a dotted line, the third voltage drop V(V03-V02) with a dot dash line, the fourth voltage drop V(V04-V03) with a long dash line, and the fifth voltage drop V(V05-V04) with a two dash line. Each of FIGS. 8E, 8G and 8I illustrate voltages at each node instead of a voltage drop. So, the voltage at the first node V01 V(V01) is illustrated with a dashed line, a voltage at the second node V02 V(V02) is illustrated with a dotted line, a voltage at the third node V03 V(V03) is illustrated with a dot dash line, a voltage at the fourth node V04 V(V04) is illustrated with a long dash line, and a voltage at the fifth node V05 V(V05-V04) is illustrated with a two dash line. Further, the current I(V) of the plurality of voltage clamps 802 of FIG. 8C is illustrated with a solid line.

FIG. 8D illustrates an example graph 803 of the voltage drops between each neighboring node V01, V02, V03, V04, V05 of the plurality of voltage clamps 802 of FIG. 8C when a voltage of a power supply 110 is supplied to the plurality of power management circuits 121 and a load is ideal, and FIG. 8E illustrates an example graph 804 of a current of the plurality of voltage clamps 802 of FIG. 8C when a voltage of a power supply 110 is supplied to the plurality of power management circuits 121 and a load is ideal. The x-axis represents increasing time (from left to right) in milliseconds. The y-axis represents voltage drop in volts.

As can be seen, the first and second voltage drops V(V01), V(V02-V01) are the first two voltage drops to reach approximately 0.8V. The third and fourth voltage drops V(V03-V02), V(V04-V03) are, respectively, the next two voltage drops to reach 0.8V. The fifth voltage drop V(V05-V04) is the last to reach 0.8V, however, once this has been reached, all of the voltage drops increase rapidly. In other words, the voltages across the first and second resistors R02, R02 increase first, and the voltage across the third to fifth resistors R03, R04, R05 increase respectively until the voltages increase rapidly and synchronously. This means that when the voltage across load R05 reaches 0.8V, the total voltage across the plurality of power management circuits Vstack has been reached.

As seen in FIG. 8E, the x-axis represents time in milliseconds, the left-hand side of the y-axis represents node voltage in volts, and the right-hand side of the y-axis represents current of the stack in amps. At the point where the voltage across the plurality of power management circuits Vstack has been reached (i.e. approximately 0.8V), the current of the plurality of voltage clamps 802 of FIG. 8C increases exponentially.

FIG. 8F illustrates an example graph 805 of the voltage drops V(V01), V(V02-V01), V(V03-V02), V(V04-V03), V(V05-V04) between each neighboring node V01, V02, V03, V04, V05 of the plurality of voltage clamps 802 of FIG. 8C when a voltage of a power supply 110 is supplied to the plurality of power management circuits 121 and a load is heavy. The x-axis represents increasing time (from left to right) in milliseconds. The y-axis represents voltage drop in volts. As can be seen, unlike the voltage seen in FIGS. 8D-8E, the voltage drops V(V01), V(V02-V01), V(V03-V02), V(V04-V03), V(V05-V04) across the loads R01, R02, R03, R04, R05 all increase at the same point because differential voltages track tightly. The voltage drops V(V01), V(V02-V01), V(V03-V02), V(V04-V03), V(V05-V04) level off as FETs within power management circuits 121 begin to conduct excess current.

FIG. 8G illustrates an example graph 806 of a current I(V) of the plurality of voltage clamps 802 of FIG. 8C when a voltage of a power supply 110 is supplied to the plurality of power management circuits 121 and a load is heavy. The x-axis represents time in milliseconds, the left-hand side of the y-axis represents node voltage in volts, and the right-hand side of the y-axis represents current of the stack in amps. At the point where the voltage across the plurality of power management circuits Vstack has been reached (i.e. approximately 0.8V), the current of the plurality of voltage clamps 802 of FIG. 8C increases exponentially.

FIG. 8H illustrates an example graph 807 of the voltage drops V(V01), V(V02-V01), V(V03-V02), V(V04-V03), V(V05-V04) between each neighboring node V01, V02, V03, V04, V05 of the plurality of voltage clamps 802 of FIG. 8C when a voltage of a power supply 110 is supplied to the plurality of power management circuits 121 and a load is asymmetric. In the present example, each of loads R01, R02, R03, R05 have the same resistance as the test fixture for a heavy load (45 mΩ) but the fourth resistor R04 has a resistance of 50Ω to create asymmetry. The load R04 acts as a fault in the circuitry. The x-axis represents increasing time (from left to right) in milliseconds. The y-axis represents voltage drop in volts. The voltage drop V(V04-V03) has clamped at approximately 825 mV to protect a processing element 131 if one were to be provided at the output power rails.

FIG. 8I illustrates an example graph 808 of a current I(V) of the plurality of voltage clamps 802 of FIG. 8C when a voltage of a power supply 110 is supplied to the plurality of power management circuits 121 and a load is asymmetric. As above, resistor R04 acts as a fault in the circuitry. The x-axis represents time in milliseconds, the left-hand side of the y-axis represents node voltage in volts, and the right-hand side of the y-axis represents current of the stack in amps. The current I(V) remains relatively unchanged in comparison with FIG. 8G due to the protection circuitry provided in the switching circuit 123 comprising a voltage clamp.

Figure 8J:
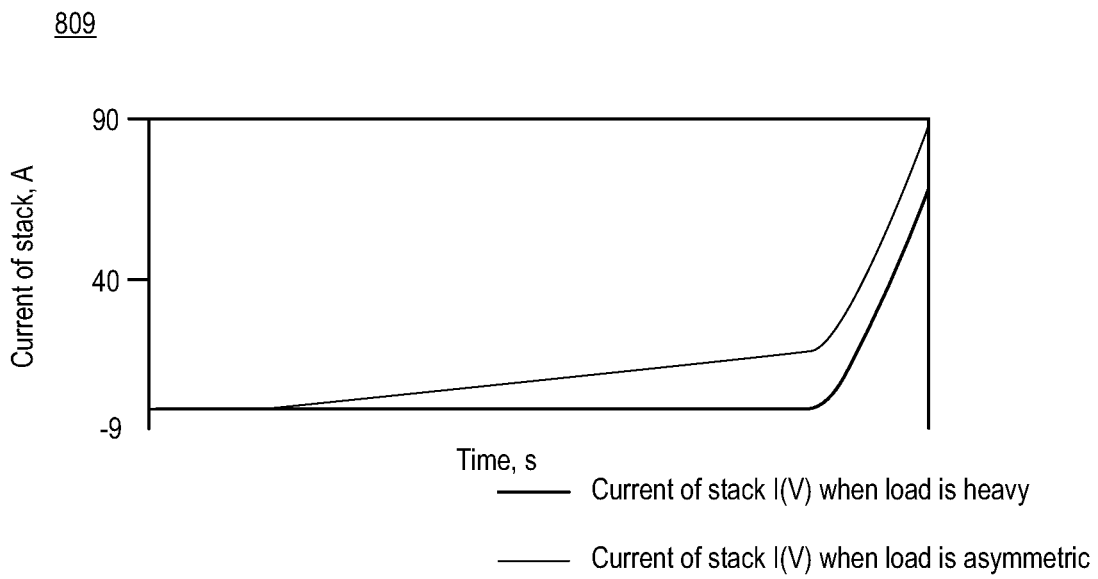
FIG. 8J illustrates an example graph of the current of the plurality of voltage clamps of FIG. 8C when a voltage of a power supply is supplied to the plurality of power management circuit and a load is either asymmetric or ideal.

FIG. 8J illustrates an example graph 809 of the current of the stack when the load is either heavy (shown with a bold, solid line) or the load is asymmetric (shown with a solid line). The x-axis represents increasing time (from left to right) in milliseconds. The y-axis represents current of the stack in amps. These cases are discussed with reference to FIGS. 8E and 8I but this graph illustrates how the current is absorbed by a FET in the event of one of the loads being asymmetrical to the other loads in the circuit. There is additional current on the FET when there is an asymmetric load. The knee that both lines show on the right-hand side of the graph show all FETs sharply increasing in current if the voltage were to continue to increase.

Figure 9A:
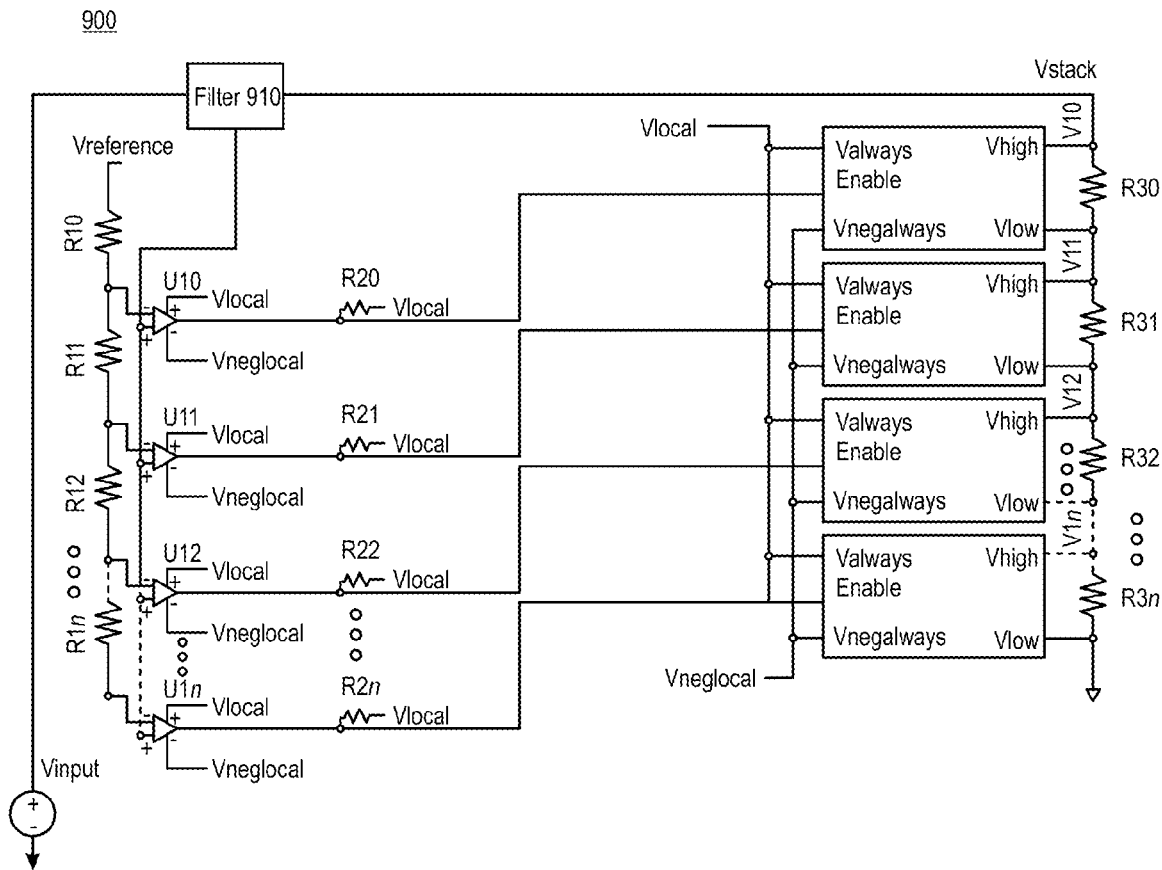
FIG. 9A illustrates an example circuit diagram of a power management system comprising a plurality of voltage clamps within switching circuits of a plurality of power management circuits and a plurality of power controllers with a power supply.

FIG. 9A illustrates an example circuit diagram of a power management system 900 comprising a plurality of voltage clamps of switching circuits 123 of a plurality of power management circuits 121 and a plurality of power controllers 124 with a power supply 110. The plurality of voltage clamps are similar to the plurality of voltage clamps of FIG. 8C and the voltage clamp provided in FIG. 8A. In the present example, each voltage clamp of a plurality of voltage clamps has the same inputs and outputs of a second power supply Valways, an inverse second power supply Vnegalways, an enable input Enable, a power high rail Vhigh and a power low rail Vlow. The plurality of voltage clamps comprise a plurality of loads R30, R31, R32, R3n and a plurality of voltage drops V10, V11, V12, . . . , Vin can be seen at the output of each of the voltage clamps. The voltage clamps of switching circuits 123 are connected to a plurality of power controllers 124 within a power management system 120. In this example, the plurality of power controllers 124 comprise a plurality of comparators U10, U11, U12, . . . , U1n and a plurality of resistors R10, R11, R12, . . . , R1n and R20, R21, R22, R2n, along with other filtering components within a filter 910. There are common input voltages Vinput, Vlocal, Vneglocal, Vreference throughout the circuit diagram.

As a voltage rises in the stack of comparators U10, U11, U12, . . . , U1n (each with the same resistance value), which are providing the function of the power controllers 124, the current climbs the stack, so transistor-based elements at a top of the stack are driven into deeper saturation to resist the voltage increase. As the voltage continues to increase, more comparators turn on, with the comparators at a bottom of the stack turning on first and the comparators at the top of the stack turning on last. This example provides a basic scenario. Each comparator in the stack of comparators U10, U11, U12, . . . , U1n may be integrated into each power management circuit 121 as its power controller 124, or in embodiments having a central controller, the comparators maybe integrated into a single circuit to form a central controller 124.

Figure 9B:
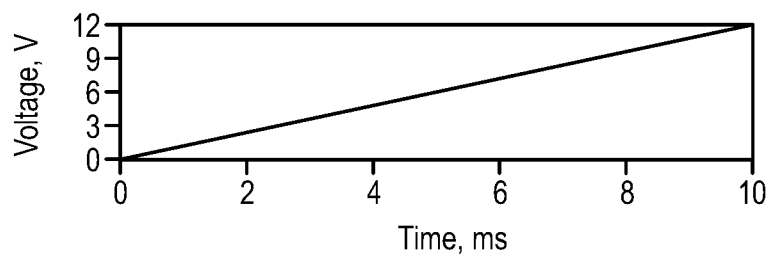
FIG. 9B illustrates an example graph displaying a voltage of the power supply of the example circuit diagram of FIG. 9A increasing.

In some examples, there may be a Field Programmable Gate Array (FPGA) with a look-up table dynamically written in software to determine which comparators route to which transistor-based elements to turn each transistor-based element off or on. In this example, the chain is shortened and lengthened at the top of the stack. In some examples, there may be a processor and an Analogue-to-Digital Converter (ADC) with digital outputs to turn each transistor-based element off or on based on software decisions. In some examples, the circuit may be prototyped using a Digital Signal Processor (DSP). Further, FIG. 9B illustrates an example graph 901 displaying a voltage of the power supply 110 of the example circuit diagram of FIG. 9A increasing from 0V to 10V in 10 ms. As the voltage of the power supply 110 rises or falls, enable lines connected to Venable of the plurality of power management circuits may toggle, allowing an effective length of the chain to be varied dynamically based on stack voltage.

Figure 9C:
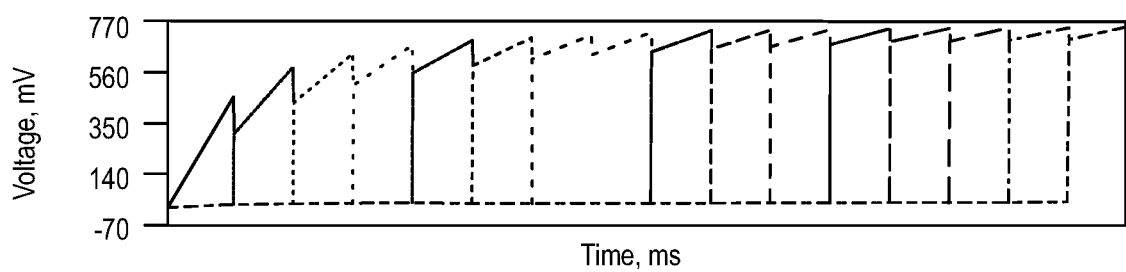
FIG. 9C illustrates an example graph displaying a differential voltage across each processing element connected to a connector of each power management circuit of the plurality of power management circuits of the example circuit diagram of FIG. 9A, wherein the power supply comprises the voltage of FIG. 9B.
Figure 9D:
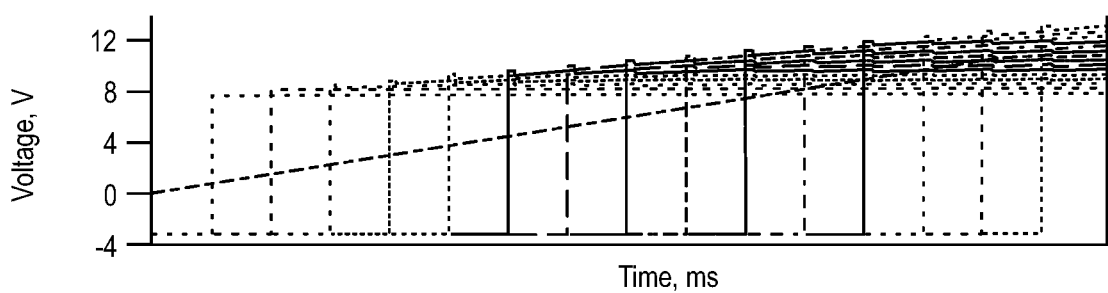
FIG. 9D illustrates an example graph displaying a voltage at which each switching circuit of each of the power management circuits of the example circuit diagram of FIG. 9A switches to an active state, where the power supply comprises the voltage of FIG. 9B.

FIG. 9C illustrates an example graph 902 displaying a differential voltage across each processing element 131 connected to a connector 122 of each power management circuit 121 of the plurality of power management circuits 121 of the example circuit diagram of FIG. 9A, wherein the power supply 110 comprises the voltage of FIG. 9B, and FIG. 9D illustrates an example graph displaying a voltage at which each switching circuit 123 of each of the power management circuits 121 of the example circuit diagram of FIG. 9A switches to an active state, where the power supply 110 comprises the voltage of FIG. 9B. In each circuit, the x-axis illustrates increasing time (from left to right) in milliseconds and the y-axis illustrates voltage in either Volts or millivolts. Each differential voltage across each processing element 131 connected to a connector 122 of each power management circuit of FIG. 9A is displayed in FIG. 9C. As the voltage rises in the stack of comparators, more comparators turn on. This can be seen in FIG. 9C as each comparator in the stack is turned on in turn moving from left to right across the x-axis in time. As can be seen in graph 902, the differential voltage across each processing element 131 remains within a limit as a voltage ramps up from the supply power. In FIG. 9D, the power management circuits 121 are switched to an active state in the order in which they appear in FIG. 9A, from the bottom of the stack to the top of the stack, switching on over time from left to right on the figure. In this manner, enable lines progressively switch from low to high based on a total voltage across the plurality of power management circuits (or the stack) Vstack. A voltage drift may be apparent because voltage is dynamically increasing in the stack. A few Vdd voltage may be required to enable the processing elements. In other examples, the total voltage across the stack Vstack may be required to enable the processing elements.

Figure 10A:
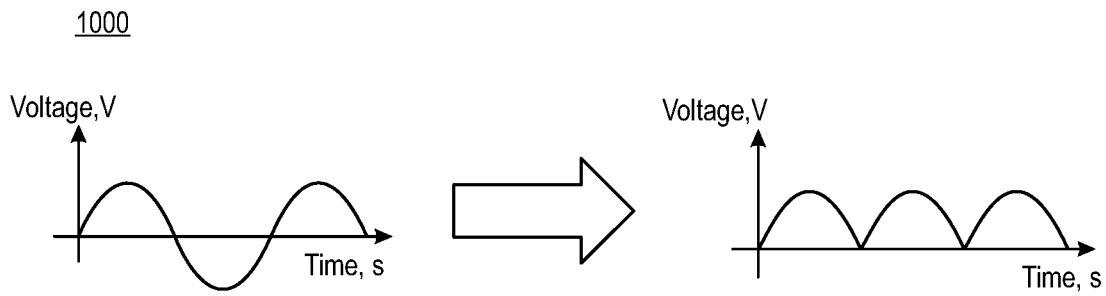
FIG. 10A illustrates an example graph displaying a rectified AC mains power supply of a power management system.

In an alternative embodiment it is possible to use an AC rectified mains as the input voltage. Given an AC rectified mains has a variable voltage, the present disclosure is able to increase the power delivered by an AC rectified mains. FIG. 10A illustrates an example graph 1000 displaying a rectified AC mains power supply of a power management system. When AC rectified mains is used, a capacity of processing by the processing elements 131 increases. When AC rectified mains is used, the inefficiencies of other examples can be decreased because optical isolation may be used with AC. The graph of FIG. 10A displays time on an x-axis and a number of power management circuits 121 with a corresponding switching circuit 123 switched to an active state U on a y-axis. As can be seen over time, the number of active switching circuits 123 fluctuates due to characteristics of the power supply 110, e.g. variance in voltage. However, in the rectified signal, it can be seen that the number of power management circuits 121 with a corresponding switching circuit 123 in an active state can be cycled depending on one or more characteristics of at least one of: the power management system, the processing elements, or the computing system 130, or more specifically, thermal characteristics. Hence, the power management system 120 is able to repeatedly enable and disable processing elements, via their respective power management circuits 121, by matching the power across the stack of processing elements 131 with the varying power delivered by the rectified AC voltage. Advantageously, the repeated nature of the rectified AC mains means it is possible to predict and closely map the power profiles of the rectified AC mains to deliver an increased processing power capability within the computing system 130.

Figure 10B:
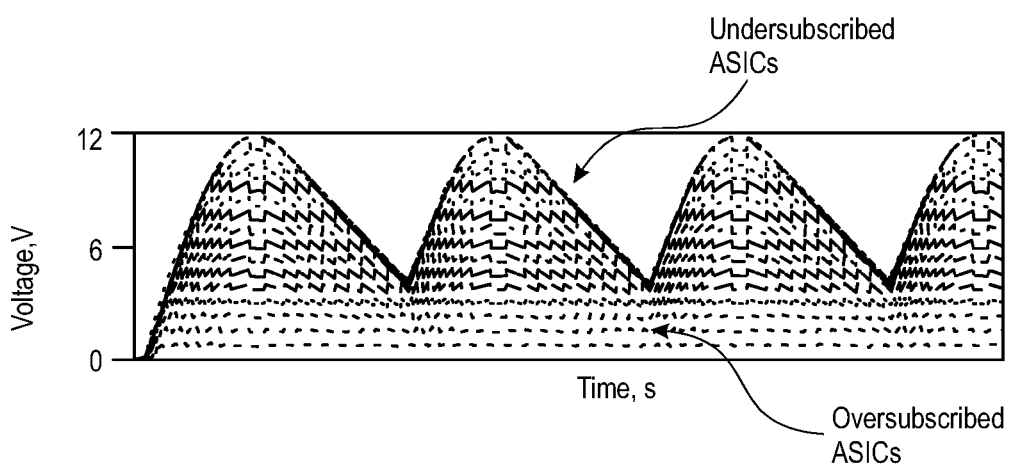
FIG. 10B illustrates an example graph displaying load balancing across a rectified AC mains power supply of a power management system.

The graph of FIG. 10B displays a problem of load balancing across a rectified AC mains power supply. Each of the lines in the graph 1001 represents a voltage across each of the power management circuits of FIG. 9A. The lines having a lower voltage represent oversubscribed ASICs, which are used when a voltage of the power supply is low, and the lines having a higher voltage represent the undersubscribed ASICs, which may only be used when the voltage of the power supply is high. This may occur when the number of active switching circuits 123 fluctuates due to the characteristics of the power supply, which may include a voltage of the power supply, and/or a variance in the voltage of the power supply. This results in suboptimal power extraction from the power supply because of the oversubscribed ASICs. When the number of active switching circuits 123 also fluctuates due to the characteristics of at least one of: the power management system, the processing elements, or the computing system 130, or more specifically, thermal characteristics, different processing elements 131 may be provided with power sufficient to enable processing, resulting in enhanced load balancing. When processing elements 131 are oversubscribed thermally, thermal sensors may be used to determine the hottest components within the power management system and disable the corresponding processing elements. Different processing elements 131 being enabled or disabled may be determined based on job scheduling and power balancing across the full ASIC stack. This example can be enabled through use of an improved interface between the switching circuits 123 (or the comparators or op amps) and the processing elements 131 (or FETs). As the processing elements 131 can be rapidly and dynamically rotated in and out of the computing system 130, it is possible to operate the processing elements 131 slightly hotter than normal operation due to improved load balancing.

The power management system for use with a computing system 130 disclosed herein may be included in the method for managing delivery of power to a computing system 130 comprising multiple processing elements, the method comprising: determining, at one or more power controllers 124, based on one or more characteristics of a power supply, whether or not a switching circuit 123 of one of a plurality of power management circuits arranged to be connected in series between terminals of the power supply should be in (i) an active state where power sufficient to enable processing is provided from the power supply, via a connector 122 of one of the power management circuits, to a processing element 131 arranged to perform application-specific processing connected to the connector 122 of the power management circuit, or (ii) an inactive state where power sufficient to enable processing is not provided to the processing element; and sending, from the one or more power controllers 124 to a switching circuit 123 of one of the plurality of power management circuits, a control signal 160/161 based on the determined state so that the switching circuit 123 can switch between the active state and the inactive state based on the control signal 160/161. There may be included one or more computer-readable transitory or non-transitory storage media embodying software that is operable when executed to perform the method disclosed herein. Further, a power controller 124 for managing delivery of power to a computing system 130 comprising multiple processing elements, the power controller 124 arranged to perform the method the method disclosed herein.

Figure 11:
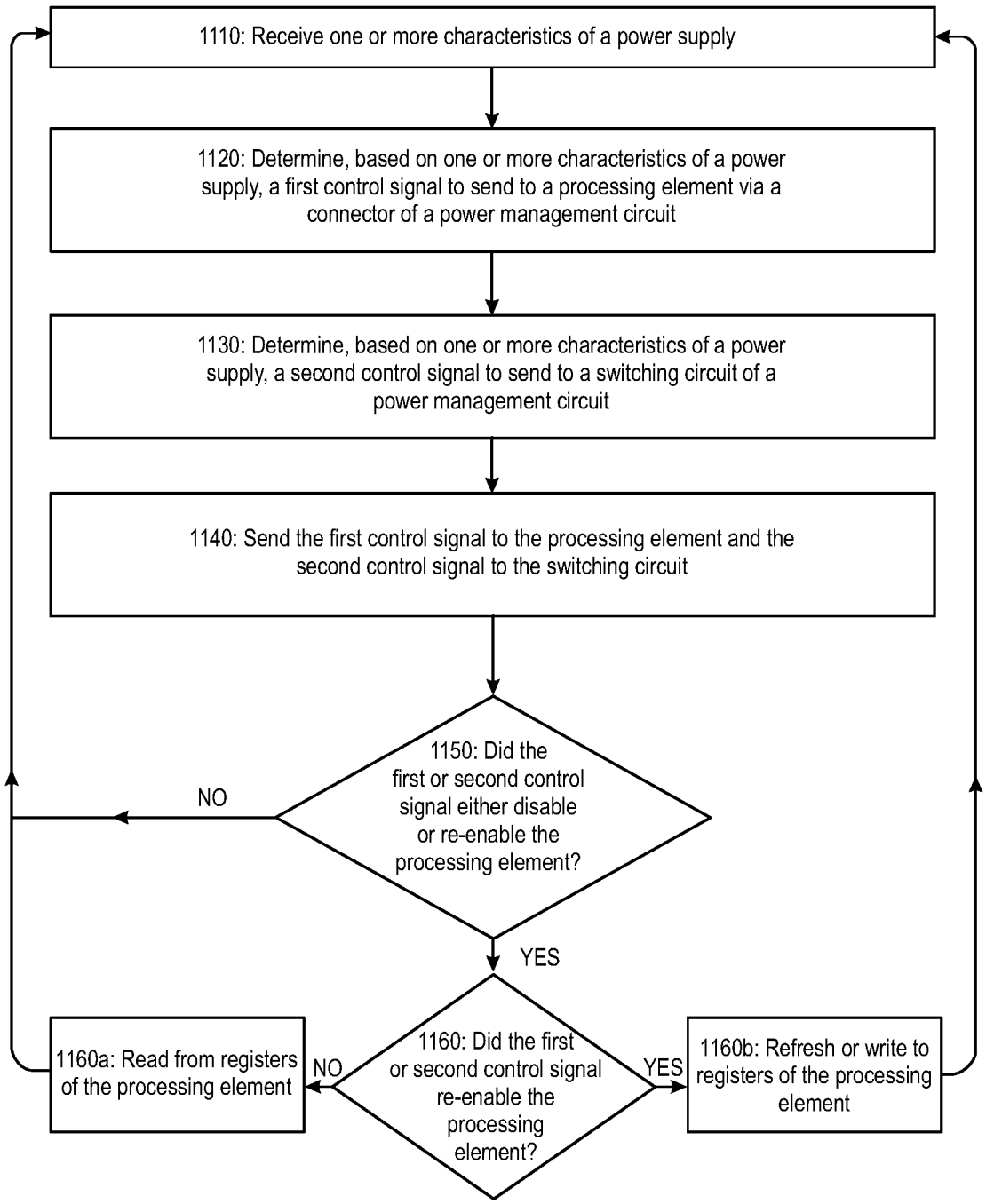
FIG. 11 illustrates an example flow chart 1100 describing the process of using a software power controller 122.

FIG. 11 illustrates a flow chart 1100 describing the process of controlling the power management system. The method disclosed may be implemented as a software power controller, however it will be appreciated that the method could be implemented in other ways. One or more characteristics of a power supply may be received at operation 1110. The software power controller 124 may receive, at operation 1110, one or more characteristics of a power supply. The power supply may be any power supply described herein, or any other power supply. A first control signal is then determined at operation 1120, based on one or more characteristics of the power supply. Separately a second control signal may also be determined at operation 1130, based on one or more characteristics of the power supply. The first and second control signals may be the first and second control signals 160, 161 described herein. In some examples, the first control signal 160 is sent to a processing element of a computing system via a connector of a power management circuit. In some examples, the second control signal 161 is sent to a switching circuit of the power management circuit. The first control signal may be sent to a processing element and the second control signal may be sent to a switching circuit. Then, it may be determined, at operation 1150, whether or not the first or second control signal disabled or re-enabled the processing element. If the processing element was not disabled or re-enabled, the power management system may wait for a period of time to receive one or more characteristics of a power supply again at operation 1110. If the processing element was disabled or re-enabled, it is determined 1160 whether the processing element was disabled or re-enabled. If the processing element was disabled, the registers of the processing element are read at operation 1160a, after which the power management system may wait for a period of time to receive one or more characteristics of the power supply again at operation 1110. If the processing element was re-enabled, the registers of the processing element are refreshed or written to at operation 1160b, after which the power management system may wait for a period of time to receive one or more characteristics of the power supply again at operation 1110. The order of steps of the method is not bound to the order of method steps in the flow chart, the steps of the method may occur in any order, if possible. Whilst a controller may implement this process in software, a hardware implementation of the method would follow the same process.

Figure 12:
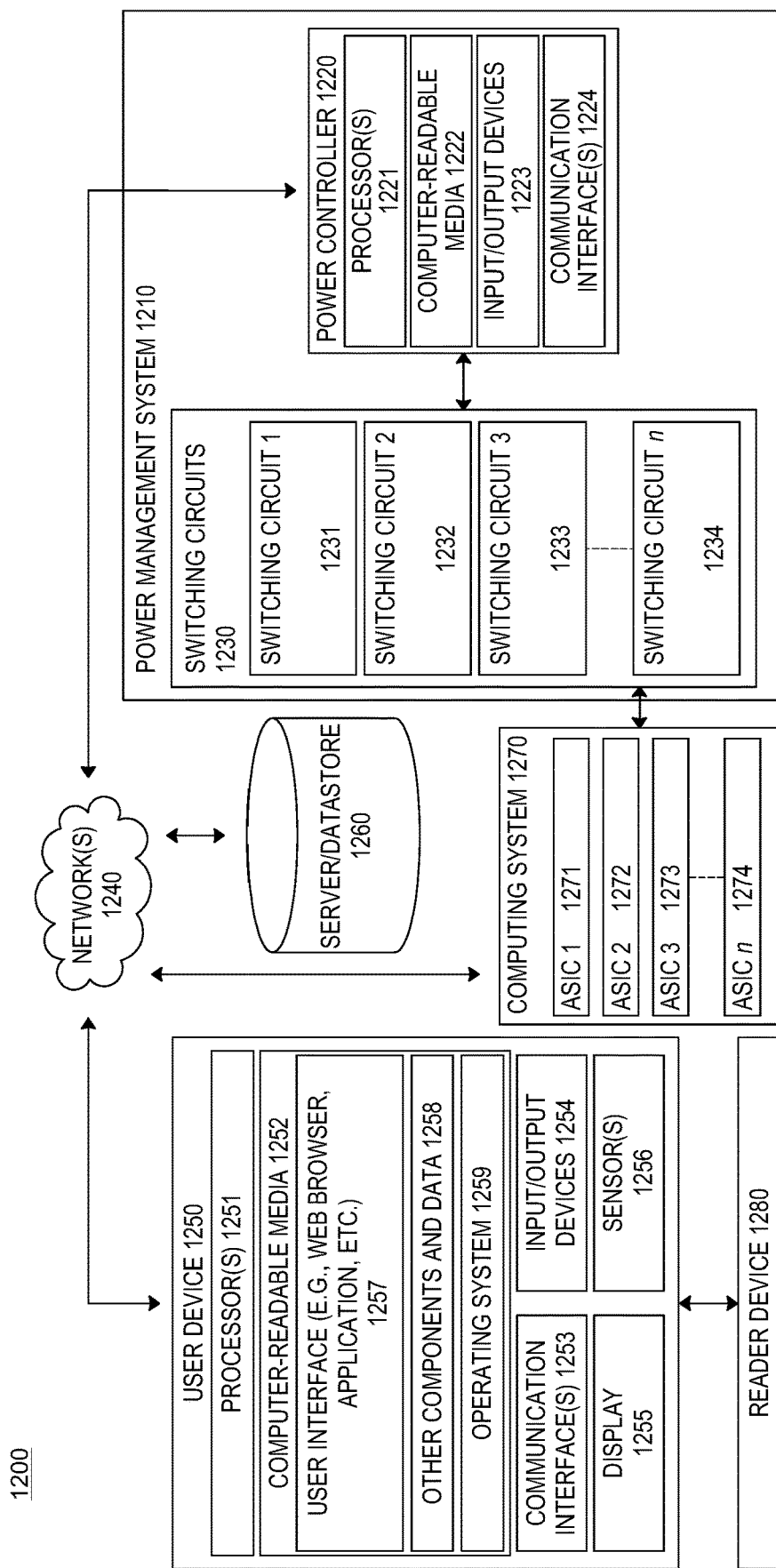
FIG. 12 illustrates an example block diagram showing a power management system in an overall system.

FIG. 12 depicts an illustrative block diagram illustrating a system 1200 for performing techniques described herein. In particular, FIG. 12 shows how a power management system 1210 including a power controller 1220 and switching circuits 1230 may communicate, via one or more network(s) 1240, with a user device 1250, and server or datastore 1260. The system 1200 includes the user device 1250, that communicates with server computing device(s) (e.g., server(s) 1260) via network(s) 1240 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1250 is illustrated, in additional or alternate examples, the system 1200 can have multiple user devices. The system 1200 also includes the computing system 1270, which performs the application-specific processing, e.g. cryptocurrency mining.

In at least one example, the user device 1250 can be any suitable type of computing device, e.g., portable, semi-portable, semi-stationary, or stationary. Some examples of the user device 1250 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1250 can be any computing device capable of sending communications and performing the functions according to the techniques described herein. The user device 1250 can include devices, e.g., payment card readers, or components capable of accepting payments, as described below.

In the illustrated example, the user device 1250 includes one or more processors 1251, one or more computer-readable media 1252, one or more communication interface(s) 1253, one or more input/output (I/O) devices 1254, a display 1255, and sensor(s) 1256.

In at least one example, each processor 1251 can itself comprise one or more processors or processing cores. For example, the processor(s) 1251 can be implemented as one or more microprocessors, microcomputers, microcontrollers, digital signal processors, central processing units, state machines, logic circuitries, and/or any devices that manipulate signals based on operational instructions. In some examples, the processor(s) 1251 can be one or more hardware processors and/or logic circuits of any suitable type specifically programmed or configured to execute the algorithms and processes described herein. The processor(s) 1251 can be configured to fetch and execute computer-readable processor-executable instructions stored in the computer-readable media 1252.

Depending on the configuration of the user device 1250, the computer-readable media 1252 can be an example of tangible non-transitory, or transitory, computer storage media and can include volatile and non-volatile memory and/or removable and non-removable media implemented in any type of technology for storage of information such as computer-readable processor-executable instructions, data structures, program components or other data. The computer-readable media 1252 can include, but is not limited to, RAM, ROM, EEPROM, flash memory, solid-state storage, magnetic disk storage, optical storage, and/or other computer-readable media technology. Further, in some examples, the user device 1250 can access external storage, such as RAID storage systems, storage arrays, network attached storage, storage area networks, cloud storage, or any other medium that can be used to store information and that can be accessed by the processor(s) 1251 directly or through another computing device or network. Accordingly, the computer-readable media 1252 can be computer storage media able to store instructions, components or components that can be executed by the processor(s) 1251. Further, when mentioned, non-transitory computer-readable media exclude media such as energy, carrier signals, electromagnetic waves, and signals per se.

The computer-readable media 1252 can be used to store and maintain any number of functional components that are executable by the processor(s) 1251. In some implementations, these functional components comprise instructions or programs that are executable by the processor(s) 1251 and that, when executed, implement operational logic for performing the actions and services attributed above to the user device 1250. Functional components stored in the computer-readable media 1252 can include a user interface 1257 to enable users to interact with the user device 1250, and thus the server(s) 1260 and/or other networked devices, e.g. power management system 1210, or computing system 1270. In at least one example, the user interface 1257 can be presented via a web browser, or the like. In other examples, the user interface 1257 can be presented via an application, such as a mobile application or desktop application, which can be provided by a service provider associated with the server(s) 1260 or other computing devices on the network, or which can be an otherwise dedicated application. In some examples, the user interface 1257 can provide a means for a user to either directly control or monitor the processing at the computing system 1270, or directly control or monitor the power management system 1210. For example, the user interface 1257 may enable a user to directly switch power off or on for specific application-specific processors. In at least one example, a user can interact with the user interface via touch input, spoken input, gesture, or any other type of input. The word "input" is also used to describe "contextual" input that may not be directly provided by the user via the user interface 1257. For example, user's interactions with the user interface 1257 are analyzed using, e.g., natural language processing techniques, to determine context or intent of the user, which may be treated in a manner similar to "direct" user input.

Depending on the type of the user device 1257, the computer-readable media 1252 can also optionally include other functional components and data, such as other components and data 1258, which can include programs, drivers, etc., and the data used or generated by the functional components. In addition, the computer-readable media 1252 can also store data, data structures and the like, that are used by the functional components. Further, the user device 1250 can include many other logical, programmatic and physical components, of which those described are merely examples that are related to the discussion herein.

In at least one example, the computer-readable media 1252 can include additional functional components, such as an operating system 1259 for controlling and managing various functions of the user device 1250 and for enabling basic user interactions.

The communication interface(s) 1253 can include one or more interfaces and hardware components for enabling communication with various other devices, such as over the network(s) 1240 or directly. For example, communication interface(s) 1253 can enable communication through one or more network(s) 1240, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

In some implementations some of the functionality may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1250 can further include one or more input/output (I/O) devices 1254. The I/O devices 1254 can include speakers, a microphone, a camera, and various user controls (e.g., buttons, a joystick, a keyboard, a keypad, etc.), a haptic output device, and so forth. The I/O devices 1254 can also include attachments that leverage the accessories (audio-jack, USB-C, Bluetooth, etc.) to connect with the user device 1250.

In at least one example, user device 1250 can include a display 1255. Depending on the type of computing device(s) used as the user device 1250, the display 1255 can employ any suitable display technology. For example, the display 1255 can be a liquid crystal display, a plasma display, a light emitting diode display, an OLED (organic light-emitting diode) display, an electronic paper display, or any other suitable type of display able to present digital content thereon. In at least one example, the display 1255 can be an augmented reality display, a virtually reality display, or any other display able to present and/or project digital content. In some examples, the display 1255 can have a touch sensor associated with the display 1255 to provide a touchscreen display configured to receive touch inputs for enabling interaction with a graphic interface presented on the display 1255. Accordingly, implementations herein are not limited to any particular display technology. Alternatively, in some examples, the user device 1250 may not include the display 1255, and information can be presented by other means, such as aurally, haptically, etc.

In addition, the user device 1250 can include sensor(s) 1256. The sensor(s) 1256 can include a GPS device able to indicate location information. Further, the sensor(s) 1256 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant, or mining facility. Location can be used in additional or alternative ways as well.

Additionally, the user device 1250 can include various other components that are not shown, examples of which include removable storage, a power source, such as a battery and power control unit, a barcode scanner, a printer, a cash drawer, and so forth.

In addition, in some examples, the user device 1250 can include, be connectable to, or otherwise be coupled to a reader device 1280, for reading payment instruments and/or identifiers associated with payment objects. In some examples, as described above, the reader device 1280 can plug in to a port in the user device 1250, such as a microphone port, a headphone port, an audio-jack, a data port, or other suitable port. In additional or alternative examples, the reader device 1280 can be coupled to the user device 1250 via another wired or wireless connection, such as via a Bluetooth®, BLE, and so on. The reader device 1280 can include a read head for reading a magnetic strip of a payment card, and further can include encryption technology for encrypting the information read from the magnetic strip. Additionally or alternatively, the reader device 1280 can be an EMV payment reader, which in some examples, can be embedded in the user device 1250. Moreover, numerous other types of readers can be employed with the user device 1250 herein, depending on the type and configuration of the user device 1250.

The reader device 1280 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1280 may include hardware implementation, such as slots, magnetic tracks, and rails with one or more sensors or electrical contacts to facilitate detection and acceptance of a payment instrument. That is, the reader device 1280 may include hardware implementations to enable the reader device 1280 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1280 may also include a biometric sensor to receive and process biometric characteristics and process them as payment instruments, given that such biometric characteristics are registered with the payment service and connected to a financial account with a bank server.

The reader device 1280 may include processing unit(s), computer-readable media, a reader chip, a transaction chip, a timer, a clock, a network interface, a power supply, and so on. The processing unit(s) of the reader device 1280 may execute one or more components and/or processes to cause the reader device 1280 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1280, the computer-readable media may include volatile memory (such as RAM), non-volatile memory (such as ROM, flash memory, miniature hard drive, memory card, or the like), or some combination thereof. In at least one example, the computer-readable media of the reader device 926 may include at least one component for performing various functions as described herein.

The reader chip may perform functionalities to control the operations and processing of the reader device 1280. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1240, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1280. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

The reader device 1280 may be arranged to take payments in fiat currency, cryptocurrency or any other suitable media of payment. When a user uses a user device 1250 connected to reader device 1280 to make a payment, funds directly or indirectly deriving from the cryptocurrency mined by the computing system 1270 may be used for payment.

It should be understood that in some examples, the reader chip may have its own processing unit(s) and computer-readable media, and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1250, which can be a POS terminal, and the reader device 1280 are shown as separate devices, in additional or alternative examples, the user device 1250 and the reader device 1280 can be part of a single device, which may be a battery-operated device. In such an example, components of both the user device 1250 and the reader device 1280 may be associated with the single device. In some examples, the reader device 1280 can have a display integrated therewith, which can be in addition to (or as an alternative of) the display 1255 associated with the user device 1250.

The server(s) 1260 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

The server(s) 1260 may be connected to any one or more of the user device 1250, computing system 1270 and power controller 1220 via network (s) 1240. The server(s) may store data relating the activity of any aspect of these components of the system 1200, or interactions between one or more of these components of the system 1200. For example, the server(s) 1260 may store data relating to cryptocurrency successfully mined. The server(s) 1260 may store data relating to processing performed by the computing system 1270. The server(s) may store account data associated with a user logged into the user device 1250. Each of this functionality may be provided on a single server or spread across multiple servers.

Further, while the figures illustrate the components and data of the server(s) or datastore 1260 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1260 can be located together or separately, and organized, for example, as virtual servers, server banks and/or server farms. The described functionality can be provided by the servers of a single merchant or enterprise, or can be provided by the servers and/or services of multiple different customers or enterprises.

When the server 1260 performs the function of a datastore it can be configured to store data that is accessible, manageable, and updatable. In some examples, the datastore 1260 can be integrated with the user device 1250 and/or the power controller 1220. In other examples, as shown in FIG. 12, the datastore 1260 can be located remotely from the power controller 1220 and can be accessible to the power controller 1220. The datastore 1260 can comprise multiple databases and/or servers connected locally and/or remotely via the network(s) 1240.

In at least one example, the datastore 1240 can store user profiles, which can include merchant profiles, customer profiles, miner profiles and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Miner profiles can store data relating to miners. For example, data relating to mining activity carried out may be stored. In addition, data relating to blocks on the blockchain successfully mined may be stored. If a miner is part of a mining pool then data relating to the pool, other members of the pool and other relevant data associated with the pool may be stored. In some implementations the datastore may store data on a private or public blockchain.

Furthermore, in at least one example, the datastore 1240 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1240 can store additional or alternative types of data as described herein.

In the illustrated example, the power controller 1220 can include one or more processors 1221, one or more computer-readable media 1222, one or more I/O devices 1223, and one or more processor communication interfaces 1224. Each processor 1221 can be a single processing unit or a number of processing units, and can include single or multiple computing units or multiple processing cores. The processor(s) 1221 can be implemented as one or more microprocessors, microcomputers, microcontrollers, digital signal processors, central processing units, state machines, logic circuitries, and/or any devices that manipulate signals based on operational instructions. For example, the processor(s) 1221 can be one or more hardware processors and/or logic circuits of any suitable type specifically programmed or configured to execute the algorithms and processes described herein. The processor(s) 1221 can be configured to fetch and execute computer-readable instructions stored in the computer-readable media 1222, which can program the processor(s) 1221 to perform the functions described herein.

The computer-readable media 1222 can include volatile and nonvolatile memory and/or removable and non-removable media implemented in any type of technology for storage of information, such as computer-readable instructions, data structures, program components, or other data. Such computer-readable media 1222 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the power controller 1220, the computer-readable media 1222 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1222 can be used to store any number of functional components that are executable by the processor(s) 1221. In many implementations, these functional components comprise instructions or programs that are executable by the processors 1221 and that, when executed, specifically configure the one or more processors 1221 to perform the actions attributed above to the service provider and/or payment processing service.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1222 can additionally include an operating system for controlling and managing various functions of the power controller 1220.

The communication interface(s) 1224 can include one or more interfaces and hardware components for enabling communication with various other devices, such as over the network(s) 1240 or directly. For example, communication interface(s) 1224 can enable communication through one or more network(s) 1240, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1240 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The communications interface(s) 1222 can also provide control signals from the power controller 1220 to the switching circuits 1230, which then control whether or not power is delivered to components of the computing system 1270.

The power controller 1220 can further be equipped with various I/O devices 1223. Such I/O devices 1223 can include a display, various user interface controls (e.g., buttons, joystick, keyboard, mouse, touch screen, biometric or sensory input devices, etc.), audio speakers, connection ports and so forth.

The power controller 1220 may control switching circuits 1230, including switching circuits 1-3, (1231, 1232, 1233) up to switching circuit n (1234). The control may be performed in the various ways that has been described. In turn each of the switching circuits may control whether or not power sufficient to enable processing is delivered to each of the application-specific processors, or application-specific integrated circuits (ASICs), that is ASIC 1 (1271), ASIC 2 (1271), ASIC 3 (1273), up to ASIC n (1274) respectively. Whilst the power controller 1220 may determine whether or not to switch certain ASICs on or off based on measured characteristics from the input/output devices 1223, for example, the power controller may also or alternatively be remotely controlled by the user device 1250, or another external computing system not shown. The user device 1250 may be able to change parameters used by the controller 1220 to determine whether or not to turn certain ASICs on or off. For example, the user device 1250 could set the power controller 1220 to use as much of the available power for mining cryptocurrency at the computing system 1270. Alternatively, the user device 1250 could set a proportion of available power to be reserved for some other use. The user device 1250 can also set the extent to which different inputs at the input/output devices 1223 are used in the determination as to whether or not to turn or off certain ASICs. For example, the user device 1250 may set an agreed thermal limit for the operation of components. In some arrangements, the power management system 1210 may use power from both a variable renewable energy source and the grid. The user device 1250 may set an amount of power to be drawn from the grid.

Whilst FIG. 12 shows that the power management system 1210 includes the power controller 1220 and switching circuits 1230, in alternative arrangements the power controller 1220 and switching circuits 1230 are separate devices. For example, the switching circuits 1230 and power controller 1220 may be located in different location and communicate via the network(s) 1240.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Examples are set-out below.

A power management system for managing delivery of power to a computing system comprising multiple processing elements is disclosed. The power management system may comprise a plurality of power management circuits arranged to be connected in series between terminals of a power supply. Each power management circuit may comprise a connector for connecting the power management circuit to a processing element arranged to perform application-specific processing. Each power management circuit may also comprise a switching circuit that, responsive to a control signal, is arranged to switch between (i) an active state where power sufficient to enable processing is provided from the power supply via the connector to the processing element, and (ii) an inactive state where power sufficient to enable processing is not provided to the processing element. The power management system may also comprise one or more power controllers arranged to determine, based on one or more characteristics of the power supply, whether or not a switching circuit of one of the plurality of power management circuits should be in an active state or an inactive state. The one or more power controllers may send a control signal to the switching circuit of the one of the plurality of power management circuits based on the determined state. Advantageously, processing levels can be improved for variations in characteristics of the power source. Therefore, more processing can be achieved within an available power from a power supply.

The one or more characteristics of the power supply may include a voltage of the power supply, and/or a variance in the voltage of the power supply. The power supply may have a variable voltage. The power supply may be a renewable energy source. The carbon footprint of such processing can therefore be reduced. The plurality of power management circuits may comprise the one or more power controllers. Advantageously, amount of processing can be improved for a varying input voltage and therefore power.

The one or more power controllers may be a central power controller. The central power controller may comprise a processor and a memory, the memory storing computer-readable media arranged to implement a method on the processor for controlling the power demand of the computing system. Each of the one or more power controllers may comprise one or more controller switching elements. Each controller switching element may be associated with a power management circuit of the plurality of power management circuits. Each controller switching element may be arranged to switch on or off according to whether or not a threshold of the at least one characteristic is met. The one or more power controllers may be arranged to determine whether or not a switching circuit of one of the plurality of power management circuits should be in an active state or an inactive state based on at least one other characteristic of any one or more of: the power management system; the one or more processing elements arranged to be connected to one or more of the plurality of power management circuits, in use; and the computing system to which the power management system manages delivery of power. The at least one other characteristic may include one or more of: a thermal characteristic; and a state of a processing element arranged to be connected to each of the plurality of power management circuits including one or more of: one or more faults of a processing element; a current state of processing of a processing element; and a current draw of a processing element. Advantageously, longevity of the hardware can be achieved. In addition, wasted processing can be avoided.

The switching circuit may comprise a transistor-based element with a conductivity controlled by the control signal. Each of the plurality of power management circuits may be configured to modulate a power usage of each processing element arranged to be connected to each of the plurality of power management circuits when a corresponding switching circuit is in an active state. The power supply may be a first power supply. The power management system may further comprise a second power supply. The second power supply may be arranged to deliver a level of power to the plurality of power management circuits sufficient to enable control of the power management circuit. The level of power sufficient to enable control of the power management circuit may be less than the power sufficient to enable processing by a processing element.

The processing element may comprise at least one application-specific integrated circuit. The application-specific processing is one of cryptocurrency mining or artificial intelligence processing.

A system is also disclosed. The system may comprise a power management system described above. The system may also comprise a computing system comprising one or more processing elements. The computing system may comprise a central processing controller arranged to provide data for processing to each processing element. The central processing controller may control processing operations performed by each processing element.

A method for managing delivery of power to a computing system comprising multiple processing elements is disclosed. The method may comprise determining, at one or more power controllers, based on one or more characteristics of a power supply, whether or not a switching circuit of one of a plurality of power management circuits arranged to be connected in series between terminals of the power supply should be in (i) an active state where power sufficient to enable processing is provided from the power supply, via a connector of one of the power management circuits, to a processing element arranged to perform application-specific processing connected to the connector of the power management circuit, or (ii) an inactive state where power sufficient to enable processing is not provided to the processing element. The method may further comprise sending, from the one or more power controllers to a switching circuit of one of the plurality of power management circuits, a control signal based on the determined state so that the switching circuit can switch between the active state and the inactive state based on the control signal. The active state may be considered a processing state. The inactive state may be considered a non-processing state.

One or more computer-readable non-transitory storage media embodying software that is operable is disclosed. The computer-readable non-transitory storage media may be able to implement any method disclosed herein.

A power controller for managing delivery of power to a computing system comprising multiple processing elements is disclosed. The power controller may be arranged to perform any power control method disclosed herein.

A power management circuit arranged to be connected in series with one or more other power management circuits between terminals of a power supply to form a power management system for managing delivery of power to a computing system comprising multiple processing elements is disclosed. The power management circuit may comprise a connector for connecting the power management circuit to a processing element arranged to perform application-specific processing. The power management circuit may comprise a switching circuit that, responsive to a control signal based on one or more characteristics of the power supply, is arranged to switch between (i) an active state where power sufficient to enable processing is provided from the power supply via the connector to the processing element, and (ii) an inactive state where power sufficient to enable processing is not provided to the processing element.

Also disclosed is a power management system for controlling delivery of power to a plurality of processing elements. The power management system may comprise a plurality of power management circuits arranged between terminals of a power supply. Each power management circuit may be configured to connect to a processing element of the plurality of processing elements. Each power management circuit may be configured to either supply sufficient power to, or prevent supply of sufficient power to, the processing element associated with the power management circuit for the processing element to perform processing. The power management system may further comprise one or more power controllers arranged to determine whether or not to supply sufficient power to a processing element of the plurality of processing elements to perform processing.

Also disclosed is a method for managing delivery of power. The power may be delivered to a computing system comprising multiple processing elements. The method may comprise determining based on one or more characteristics of a power supply, whether or not a switching circuit of one of a plurality of power management circuits arranged to be connected in series between terminals of the power supply should be in (i) a first state where power sufficient to enable processing is provided from the power supply, via a connector of one of the power management circuits, to a processing element arranged to perform application-specific processing connected to the connector of the power management circuit, or (ii) a second state where power sufficient to enable processing is not provided to the processing element. The method may further comprise sending a control signal based on the determined state to a switching circuit of one of the plurality of switching circuits so that the switching circuit can switch between the first state and the second state based on the control signal.

Also disclosed is a power management system comprising a plurality of power management circuits that may be arranged to be connected in series between terminals of a power supply. Each power management circuit may comprise a connector via which power is supplied to a processing element. Each power management circuit may comprise a switching circuit that may be arranged to either supply power sufficient to enable the processing element to perform processing, or prevent power sufficient to enable processing to be supplied to the processing element. The power management system may further comprise one or more power controllers that may be arranged to determine, based on one or more characteristics of the power supply, whether or not a switching circuit of one of the plurality of power management circuits should supply sufficient power to the processing element to enable processing.

Illustrative aspects of the disclosure include:

Aspect 1. A power management system for managing delivery of power to a computing system comprising multiple processing elements, the power management system comprising: a plurality of power management circuits arranged to be connected in series between terminals of a power supply, wherein each power management circuit comprises: a connector for connecting the power management circuit to a processing element arranged to perform application-specific processing; and a switching circuit that, responsive to a control signal, is arranged to switch between (i) an active state where power provided from the power supply via the connector to the processing element is greater than or equal to a power threshold indicative of sufficient power to power processing, and (ii) an inactive state where power provided to the processing element is less than the power threshold; and one or more power controllers arranged to determine, based on one or more characteristics of the power supply, a state that a first switching circuit of one of the plurality of power management circuits is to be in, wherein the state is the active state or the inactive state, wherein the one or more power controllers send a control signal to the first switching circuit of the one of the plurality of power management circuits based on the state.

Aspect 2. The power management system of Aspect 1, wherein the one or more characteristics of the power supply include a voltage of the power supply.

Aspect 3. The power management system of any of Aspects 1 to 2, wherein the power supply is a renewable energy source delivering a variable voltage.

Aspect 4. The power management system of any of Aspects 1 to 3, wherein each of the one or more power controllers comprises one or more controller switching elements, each controller switching element associated with a power management circuit of the plurality of power management circuits and arranged to switch between on and off states according to whether a threshold of the one or more characteristics is met.

Aspect 5. The power management system of any of Aspects 1 to 4, wherein the processing element comprises at least one application-specific integrated circuit (ASIC) configured to perform cryptocurrency mining.

Aspect 6. The power management system of any of Aspects 1 to 5, wherein the one or more power controllers include a central power controller.

Aspect 7. The power management system of any of Aspects 1 to 6, wherein the central power controller comprises a processor and a memory, when executed by the processor, cause the central power controller to control power demand of the computing system.

Aspect 8. A power management system for controlling delivery of power to a plurality of processing elements, the power management system comprising: a plurality of power management circuits arranged between terminals of a power supply, wherein each power management circuit is configured to connect to a processing element of the plurality of processing elements and control whether sufficient power for powering processing is supplied to the processing element associated with the power management circuit; and one or more power controllers arranged to determine whether to supply the sufficient power for powering processing to the processing element of the plurality of processing elements.

Aspect 9. The power management system of Aspect 8, wherein the plurality of power management circuits are arranged in series between the terminals of the power supply.

Aspect 10. The power management system of any of Aspects 8 to 9, wherein the one or more power controllers are arranged to determine whether to supply the sufficient power for powering processing based on one or more characteristics of the power supply.

Aspect 11. The power management system of any of Aspects 8 to 10, wherein the one or more characteristics of the power supply include at least one of a voltage of the power supply, and a variance in the voltage of the power supply.

Aspect 12. The power management system of any of Aspects 8 to 11, wherein the plurality of power management circuits each comprise: a connector for connecting to and supplying power to the processing element, and a switching element for controlling supply of power to the processing element.

Aspect 13. The power management system of any of Aspects 8 to 12, wherein the power supply is a renewable energy source with a variable voltage.

Aspect 14. The power management system of any of Aspects 8 to 13, wherein the plurality of power management circuits comprises the one or more power controllers.

Aspect 15. The power management system of any of Aspects 8 to 14, wherein each of the one or more power controllers comprises one or more controller switching elements, each controller switching element associated with a power management circuit of the plurality of power management circuits and arranged to switch between an on state and an off state according to whether a threshold is met, wherein the threshold is based on one or more characteristics of the power supply.

Aspect 16. The power management system of any of Aspects 8 to 15, wherein the one or more power controllers are arranged to determine whether to supply sufficient power based on at least one characteristic of at least one of: the power management system; the processing element; or a computing system to which the power management system manages delivery of power.

Aspect 17. The power management system of any of Aspects 8 to 16, wherein the at least one characteristic includes at least one of: a thermal characteristic; or a state of the processing element, including at least one of: one or more faults of the processing element; a current state of processing of the processing element; or a current draw of the processing element.

Aspect 18. The power management system of any of Aspects 8 to 17, wherein each of the plurality of power management circuits is configured to modulate a power usage of each processing element arranged to be connected to each of the plurality of power management circuits.

Aspect 19. The power management system of any of Aspects 8 to 18, wherein the power supply is a first power supply, and wherein the power management system further comprises a second power supply arranged to deliver a level of power to the plurality of power management circuits sufficient to power control at a power management circuit of the plurality of power management circuits, wherein the level of power sufficient to power control at the power management circuit is less than the power sufficient to power processing at the processing element.

Aspect 20. The power management system of any of Aspects 8 to 19, wherein the processing element comprises at least one application-specific integrated circuit (ASIC) configured to perform application-specific processing.

Aspect 21. The power management system of any of Aspects 8 to 20, wherein the application-specific processing is one of cryptocurrency mining or artificial intelligence processing.

Aspect 22. A method for managing delivery of power to a computing system comprising multiple processing elements, the method comprising: determining, based on one or more characteristics of a power supply, a state that a switching circuit is to be in, wherein the switching circuit is of one of a plurality of power management circuits arranged to be connected in series between terminals of the power supply, wherein the state is one of (i) a first state where power provided from the power supply, via a connector of one of the plurality of power management circuits, to a processing element arranged to perform application-specific processing connected to the connector of the one of the plurality of power management circuits is greater than or equal to a power threshold indicative of sufficient power to power processing, or (ii) a second state where power provided to the processing element is less than the power threshold; and sending a control signal based on the state to the switching circuit to cause the switching circuit to switch between the first state and the second state based on the control signal.

Aspect 23. A power management circuit arranged to be connected in series with one or more other power management circuits between terminals of a power supply to form a power management system for managing delivery of power to a computing system comprising multiple processing elements, the power management circuit comprising: a connector for connecting the power management circuit to a processing element arranged to perform application-specific processing; and a switching circuit that, responsive to a control signal based on one or more characteristics of the power supply, is arranged to switch between (i) a processing state in which power provided from the power supply via the connector to the processing element is greater than or equal to a power threshold indicative of sufficient power to power processing, and (ii) a non-processing state where power provided to the processing element is less than the power threshold.

Aspect 24: A non-transitory computer-readable medium having stored thereon instructions that, when executed by one or more processors, cause the one or more processors to: determine, based on one or more characteristics of a power supply, a state that a switching circuit is to be in, wherein the switching circuit is of one of a plurality of power management circuits arranged to be connected in series between terminals of the power supply, wherein the state is one of (i) a first state where power provided from the power supply, via a connector of one of the plurality of power management circuits, to a processing element arranged to perform application-specific processing connected to the connector of the one of the plurality of power management circuits is greater than or equal to a power threshold indicative of sufficient power to power processing, or (ii) a second state where power provided to the processing element is less than the power threshold; and send a control signal based on the state to the switching circuit to cause the switching circuit to switch between the first state and the second state based on the control signal.

Aspect 25: The non-transitory computer-readable medium of Aspect 24, further comprising operations according to any of Aspects 2 to 21.

Aspect 26: An apparatus for image processing, the apparatus comprising: means for determining, based on one or more characteristics of a power supply, a state that a switching circuit is to be in, wherein the switching circuit is of one of a plurality of power management circuits arranged to be connected in series between terminals of the power supply, wherein the state is one of (i) a first state where power provided from the power supply, via a connector of one of the plurality of power management circuits, to a processing element arranged to perform application-specific processing connected to the connector of the one of the plurality of power management circuits is greater than or equal to a power threshold indicative of sufficient power to power processing, or (ii) a second state where power provided to the processing element is less than the power threshold; and means for sending a control signal based on the state to the switching circuit to cause the switching circuit to switch between the first state and the second state based on the control signal.

Aspect 27: The apparatus of Aspect 26, further comprising means for performing operations according to any of Aspects 2 to 21.

The invention claimed is:

1. A power management system for controlling delivery of power to a plurality of processing elements, the power management system comprising:
   a plurality of power management circuits arranged between terminals of a power supply, wherein the plurality of power management circuits are each in one of a plurality of states, wherein the plurality of states include an active state and an inactive state, wherein each power management circuit of the plurality of power management circuits conveys at least a threshold amount of power to a processing element of the plurality of processing elements while the power management circuit is in the active state, wherein the threshold amount of power includes sufficient power to power processing by the processing element; and
   one or more power controllers that set each of the plurality of power management circuits to respective states of the plurality of states based on one or more characteristics of the power supply.

2. The power management system of claim 1, wherein at least a subset of the plurality of power management circuits are arranged in series between the terminals of the power supply.

3. The power management system of claim 1, wherein at least a subset of the plurality of power management circuits are arranged in parallel between the terminals of the power supply.

4. The power management system of claim 1, wherein the one or more characteristics of the power supply include a variance in a voltage of the power supply.

5. The power management system of claim 1, wherein a first power management circuit of the plurality of power management circuits includes:
   a connector that couples the first power management circuit to a first processing element of the plurality of processing elements, wherein the connector conveys power from the power supply to the first processing element, and
   a switching element that controls a first state of the first power management circuit based on an input from the one or more power controllers, wherein the first state is one of the respective states of the plurality of power management circuits, and wherein the first state is one of the plurality of states.

6. The power management system of claim 1, wherein the power supply is a renewable energy source with a variable voltage.

7. The power management system of claim 1, wherein the plurality of power management circuits includes the one or more power controllers.

8. The power management system of claim 1, wherein each of the one or more power controllers includes one or more controller switching elements, wherein each controller switching element is associated with a power management circuit of the plurality of power management circuits and is arranged to switch between the active state and the inactive state according to whether a threshold is met, wherein the threshold is associated with the one or more characteristics of the power supply.

9. The power management system of claim 1, wherein power is received by a first processing element from the power supply via a connector at a first level exceeding the threshold amount of power while a first power management circuit is in the active state, wherein the plurality of processing elements includes the first processing element, wherein the plurality of power management circuits includes the first power management circuit, wherein power is received by the first processing element from the power supply via the connector at a second level below the threshold amount of power while the first power management circuit is in the inactive state.

10. The power management system of claim 1, wherein the one or more power controllers set each of the plurality of power management circuits to the respective states based on the one or more characteristics of the power supply and at least one characteristic of at least one of:
the power management system;
at least one of the plurality of processing elements; or
a computing system to which the power management system manages delivery of power.

11. The power management system of claim 10, wherein the at least one characteristic includes at least one of:
a thermal characteristic;
one or more faults;
a current processing state;
a current state of the plurality of states; or
a current power draw.

12. The power management system of claim 1, wherein each power management circuit of the plurality of power management circuits modulates a power usage of at least one processing element coupled to the power management circuit, wherein the plurality of processing elements includes the at least one processing element.

13. The power management system of claim 1, wherein a second power supply delivers at least a second threshold amount of power to the plurality of power management circuits, wherein the second threshold amount of power includes sufficient power to power control by at least one of the plurality of power management circuits of at least one of the plurality of power management circuits, wherein the second threshold amount of power is lower than the threshold amount of power.

14. The power management system of claim 1, wherein the processing element includes at least one application-specific integrated circuit (ASIC) that performs application-specific processing.

15. The power management system of claim 14, wherein the application-specific processing includes artificial intelligence processing.

16. A method of power management for controlling delivery of power to a plurality of processing elements, the method comprising:
setting, using one or more power controllers, each of a plurality of power management circuits to respective states of a plurality of states based on one or more characteristics of a power supply, wherein the plurality of power management circuits are arranged between terminals of the power supply, wherein the plurality of power management circuits are each in one of the plurality of states, wherein the plurality of states include an active state and an inactive state, wherein each power management circuit of the plurality of power management circuits conveys at least a threshold amount of power to a processing element of the plurality of processing elements while the power management circuit is in the active state, wherein the threshold amount of power includes sufficient power to power processing by the processing element.

17. The method of claim 16, wherein at least a subset of the plurality of power management circuits are arranged in series between the terminals of the power supply.

18. The method of claim 16, wherein the one or more characteristics of the power supply include a variance in a voltage of the power supply.

19. The method of claim 16, further comprising:
determining whether a threshold is met, wherein the threshold is associated with the one or more characteristics of the power supply, wherein setting at least one of the plurality of power management circuits to at least one of the respective states is based on whether the threshold is met.

20. The method of claim 16, wherein setting each of the plurality of power management circuits to the respective states is based on the one or more characteristics of the power supply and at least one characteristic of at least one of:
a power management system that includes the plurality of power management circuits and the one or more power controllers;
at least one of the plurality of processing elements; or
a computing system to which the power management system manages delivery of power.

\* \* \* \* \*